US 11,519,456 B2

United States Patent
Hayashi et al.

(10) Patent No.: US 11,519,456 B2
(45) Date of Patent: Dec. 6, 2022

(54) JOINT STRUCTURE APPROPRIATE FOR ROBOT JOINT

(71) Applicant: GROOVE X, Inc., Tokyo (JP)

(72) Inventors: Kaname Hayashi, Tokyo (JP); Takamitsu Ikoma, Tokyo (JP); Minoru Koizumi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 483 days.

(21) Appl. No.: 16/554,642

(22) Filed: Aug. 29, 2019

(65) Prior Publication Data

US 2019/0390704 A1     Dec. 26, 2019

Related U.S. Application Data

(63) Continuation of application No. PCT/JP2018/013079, filed on Mar. 29, 2018.

(30) Foreign Application Priority Data

Mar. 29, 2017   (JP) .............................. JP2017-065459

(51) Int. Cl.
*F16D 3/40*     (2006.01)
*F16C 11/06*    (2006.01)
(Continued)

(52) U.S. Cl.
CPC ................ *F16C 11/06* (2013.01); *A63H 3/46* (2013.01); *F16D 3/06* (2013.01); *F16D 3/40* (2013.01);
(Continued)

(58) Field of Classification Search
CPC ..... F16D 3/26; F16D 3/38; F16D 3/40; F16D 3/382; Y10T 403/32041; Y10T 403/1616;
(Continued)

(56) References Cited

U.S. PATENT DOCUMENTS

| 4,894,901 A | * | 1/1990 | Soderberg | ............ | B25J 19/0012 |
| | | | | | 29/469 |
| 6,565,371 B1 | | 5/2003 | Watanabe | | |
| | | | (Continued) | | |

FOREIGN PATENT DOCUMENTS

| CA | 2592905 A1 | 1/2008 | | |
| DE | 4205997 C1 | * | 3/1993 | ............. B60K 17/28 |
| | (Continued) | | | |

OTHER PUBLICATIONS

English translation of JP 2002307354 A, Yamada, Oct. 23, 2002 (Year: 2002).*

(Continued)

*Primary Examiner* — Amber R Anderson
*Assistant Examiner* — David M Griffin
(74) *Attorney, Agent, or Firm* — Hauptman Ham, LLP

(57) ABSTRACT

A joint structure is used in connecting a first region and a second region of a robot. The joint structure includes a first member provided in the first region, a second member provided in the second region and having an engagement face that engages with the first member, and a coupling mechanism that causes a coupling force of the first member and the second member to be utilized to the full so that an engaged state of the first member and the second member is maintained. The coupling mechanism breaks the engaged state when a relative displacement of the first member and the second member from the engaged state exceeds a predetermined amount.

20 Claims, 17 Drawing Sheets

(51) Int. Cl.
  *A63H 3/46* (2006.01)
  *F16D 3/06* (2006.01)
  *A63H 3/00* (2006.01)
  *A63H 3/28* (2006.01)
  *A63H 3/38* (2006.01)
(52) U.S. Cl.
  CPC .............. *A63H 3/003* (2013.01); *A63H 3/28* (2013.01); *A63H 3/38* (2013.01); *A63H 2200/00* (2013.01)
(58) Field of Classification Search
  CPC ... Y10T 403/1624; Y10T 403/52; A63H 3/46; A63H 29/24; A63H 11/00; A63H 13/00; F16C 11/06
  See application file for complete search history.

(56) References Cited

U.S. PATENT DOCUMENTS

| | | | |
|---|---|---|---|
| 2008/0012517 | A1 | 1/2008 | Kniss et al. |
| 2009/0071282 | A1 | 3/2009 | Takemura |
| 2009/0233720 | A1 | 9/2009 | Shim et al. |
| 2014/0277724 | A1 | 9/2014 | Suyama et al. |
| 2018/0235721 | A1 * | 8/2018 | Tamura .................. G02B 7/001 |

FOREIGN PATENT DOCUMENTS

| | | | | |
|---|---|---|---|---|
| DE | 102009058653 | A1 | 6/2011 | |
| DE | 102011109786 | A1 | 2/2013 | |
| JP | 2000-323219 | A | 11/2000 | |
| JP | 2002-172582 | A | 6/2002 | |
| JP | 2005-125436 | A | 5/2005 | |
| JP | 2009-220266 | A | 10/2009 | |
| JP | 2014-83465 | A | 5/2014 | |
| WO | WO-9321752 | A1 * | 11/1993 | ............. A01B 71/08 |
| WO | 2007/088743 | A1 | 8/2007 | |
| WO | 2011/030690 | A1 | 3/2011 | |
| WO | WO-2012005772 | A2 * | 1/2012 | ............... A63H 1/00 |
| WO | 2012/141130 | A1 | 10/2012 | |
| WO | 2015/111186 | A1 | 7/2015 | |
| WO | WO-2016067474 | A1 * | 5/2016 | ............... A63F 9/00 |
| WO | 2017/029907 | A1 | 2/2017 | |

OTHER PUBLICATIONS

English translation of JP 2005125436 A, Akachi, May 19, 2005 (Year: 2005).*
English description of CA 2372188 A1, McMahon, Feb. 8, 2001 (Year: 2001).*
Office Action in DE Application No. 112018001700.1, dated Aug. 6, 2021. 6pp.
Office Action in CN Application No. 201880015948.0, dated Mar. 3, 2022, 14pp.
International Search Report in PCT/JP2018/013079, dated Jul. 3, 2018. 8pp.
Office Action in JP Application No. 2018-569178 dated Apr. 2, 2019. 8pp.

* cited by examiner

JOINT STRUCTURE APPROPRIATE FOR ROBOT JOINT

RELATED APPLICATIONS

The present application is a continuation of International Application No. PCT/JP2018/013079, filed Mar. 29, 2018, which claims priority from Japanese Application No. 2017-065459, filed Mar. 29, 2017, the disclosures of which applications are hereby incorporated by reference herein in their entirety.

TECHNICAL FIELD

The present invention relates to a joint structure that couples a multiple of members to each other, and relates in particular to a joint structure appropriate for a joint of a robot.

BACKGROUND ART

There have been advances in development of an autonomously acting robot, such as a humanoid robot or a pet robot, that provides interaction and solace for a human (for example, refer to Patent Document 1). This kind of robot is such that behavior is caused to evolve by learning autonomously based on a peripheral situation, and there are those that attain an existence close to that of a living being.

Patent Document 1: JP-A-2000-323219

SUMMARY OF INVENTION

Technical Problem

Note that it is also envisaged that when this kind of robot moves around indoors, the robot might hit an obstacle, or trip on a step and fall over, in the process of the autonomous learning. Alternatively, the robot might lift up an object that is indoors. In such a case, an unexpected load might be exerted on a joint of the robot. Because the behavior of this kind of robot evolves, designing the robot while envisaging a range of a load to be exerted in advance is difficult.

The invention being an invention completed based on a recognition of the heretofore described problem, one object thereof is to provide a joint structure appropriate for a joint of a robot.

Solution to Problem

An aspect of the invention is a joint structure used in connecting a first region and a second region of a robot. The joint structure includes a first member provided in the first region, a second member provided in the second region and having an engagement face that engages with the first member, and a coupling mechanism that causes a coupling force of the first member and the second member to be utilized to the full so that an engaged state of the first member and the second member is maintained. The coupling mechanism breaks the engaged state when a relative displacement of the first member and the second member from the engaged state exceeds a predetermined amount.

Another aspect of the invention is also a joint structure. The joint structure includes a first member, a first shaft supported by the first member, a second shaft coupled via a joint to the first shaft so as to be capable of pivoting, and a second member supported by the second shaft. A through path that penetrates the first shaft and the second shaft is formed, and wiring is inserted through the through path.

Still another aspect of the invention is a robot wherein a first region and a second region are connected. The robot includes a first member configuring the first region, a second member configuring the second region and having an engagement face that engages with the first member, and a coupling mechanism that causes a coupling force of the first member and the second member to be utilized to the full so that an engaged state of the first member and the second member is maintained. The coupling mechanism breaks the engaged state when a relative displacement of the first member and the second member from the engaged state exceeds a predetermined amount.

Still another aspect of the invention is also a robot. The robot includes a first member configuring a first region, a first shaft supported by the first member, a second shaft coupled via a joint to the first shaft so as to be capable of pivoting, and a second member supported by the second shaft and configuring the second region. A through path that penetrates the first shaft and the second shaft is formed, and wiring is inserted through the through path.

Advantageous Effects of Invention

According to the invention, a joint structure appropriate for a joint of a robot can be provided.

BRIEF DESCRIPTION OF DRAWINGS

FIGS. 13A and 13B show the separating process.

FIG. 16A is a sectional view representing a joint structure in an engaged state of a first member and a second member according another modified example (a fourth modified example). FIG. 16B is a sectional view representing a joint structure in a separated state.

DESCRIPTION OF EMBODIMENTS

Figure 1A:
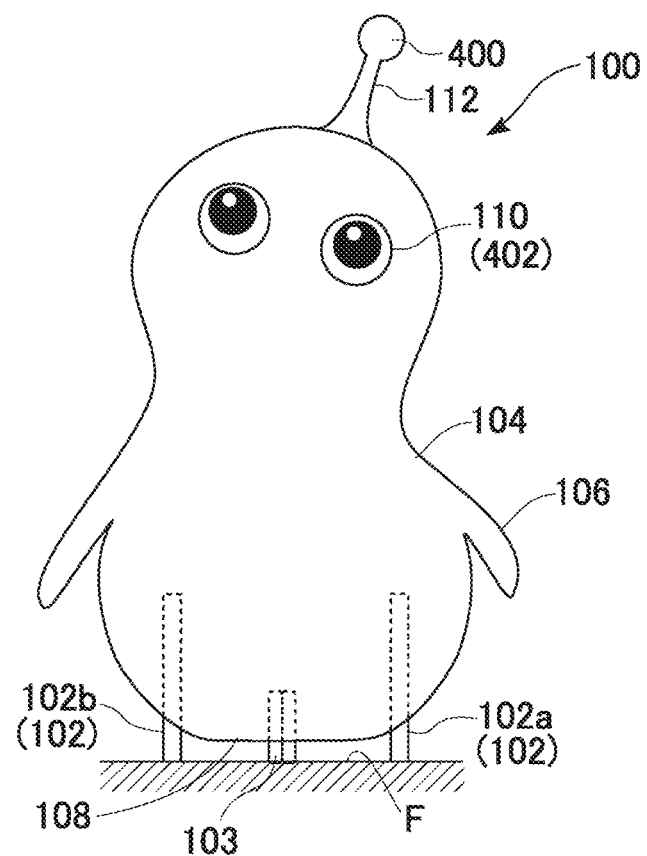
FIG. 1A is a front view.

Hereafter, referring to the drawings, an embodiment of the invention will be described in detail. In the following description, for the sake of convenience, a positional relationship of each structure may be expressed with a state shown in the drawings as a reference. Also, the same reference signs will be allotted to practically identical components in the following embodiment and modified examples thereof, and a description thereof may be omitted as appropriate.

The embodiment incorporates a structure based on what is called dislocation in a human or an animal, so that a portion in which a first region and a second region are connected, such as a joint of a robot, is not easily destroyed. That is, a machine having an arm utilized in a factory or the like is such that a range of a load to be handled is determined in advance, and the machine is designed so as to move ideally without being destroyed provided that the load is within the range. Meanwhile, a robot that has utilization in a home as a main object is such that a load range is difficult to establish. When sufficient leeway is provided in a load capacity, the robot becomes a robot of a heavyweight class, like an industrial robot, and utilization in a home is difficult. Nevertheless, load capacity design within a range allowed in a home to date is such that when a load exceeding an envisaged limit is exerted on a robot, a joint or the like of the robot breaks. In particular, an autonomously acting robot whose development is being promoted in recent years behaves in accordance with a selection by the robot itself, and because behavior of the robot evolves, predicting a range of a load that might be exerted on a joint is difficult. Therefore, a construction such that when a load exceeding a limit acts on a joint, a controlled destruction called dislocation is deliberately caused, whereby the load is deflected and destruction is prevented, is realized in the embodiment. Hereafter, details thereof will be described.

Figure 1B:
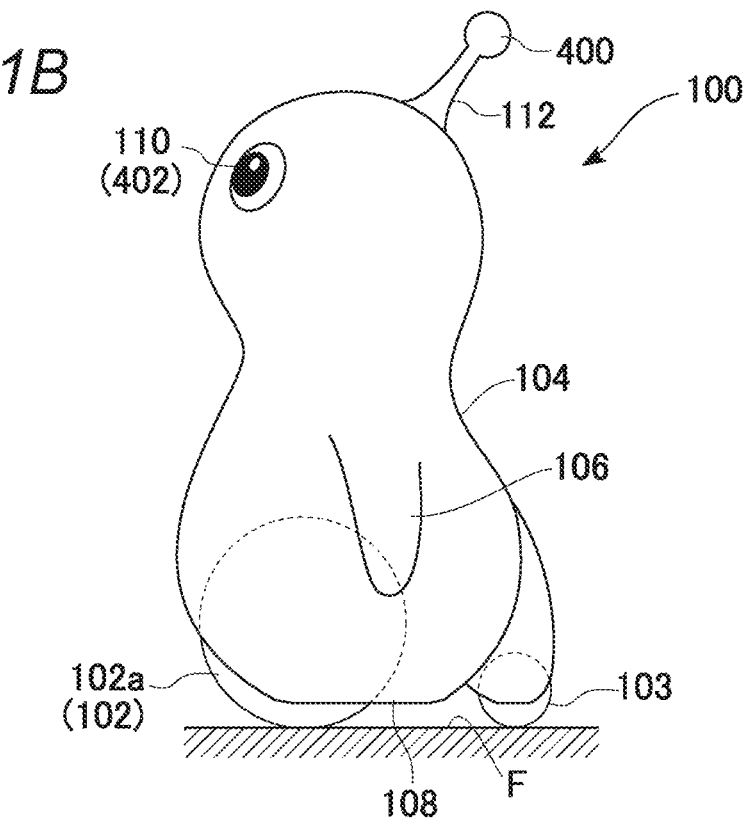
FIG. 1B is a side view representing an external appearance of a robot according to an embodiment.

FIG. 1A is a front view representing an external appearance of a robot 100 according to the embodiment, and FIG. 1B is a side view representing an external appearance of a robot 100 according to the embodiment.

The robot 100 in the embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A height of the robot 100 is 1.2 meters or less, or preferably 0.7 meters or less. The user can hold the robot 100 with an effort equivalent to that of holding a very young baby.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism and a linking mechanism) to be described hereafter. A greater portion of each wheel is hidden by the body 104 when traveling too, but when each wheel is comely housed in the body 104, the robot 100 is in a state of being unable to move. That is, the body 104 descends, and sits on a floor surface, in accompaniment to an operation of the wheels being housed. In the sitting state, a flat seating face 108 (a grounding bottom face) formed in a bottom portion of the body 104 comes into contact with the floor surface F.

The robot 100 has two arms 106. The arms 106 do not have a function of gripping an object. The arms 106 are capable of performing simple actions such as raising, waving, and oscillating. The two arms 106 can also be individually controlled.

Two eyes 100 are provided in a head portion front face (a face) of the robot 100. A high resolution camera 402 is incorporated in the eye 110. The eye 110 is also capable of an image display using a liquid crystal element or an organic EL element. A speaker is incorporated, and the robot 100 is also capable of simple speech. A horn 112 is attached to an apex portion of the robot 100.

An omnidirectional camera 400 (a first camera) is incorporated in the horn 112 of the robot 100 of the embodiment. The omnidirectional camera 400 can film in all directions up and down and left and right (360 degrees: in particular, practically all regions above the robot 100) at one time using a fisheye lens. The high resolution camera 402 (a second camera) incorporated in the eye 110 can film only in a direction in front of the robot 100. A filming range of the omnidirectional camera 400 is wide, but resolution is lower than that of the high resolution camera 402.

In addition to this, the robot 100 incorporates various sensors, such as a temperature sensor (thermosensor) that converts a peripheral temperature distribution into an image, a microphone array having a multiple of microphones, a form measuring sensor (depth sensor) that can measure a form of a measurement target, and an ultrasonic wave sensor.

Figure 2:
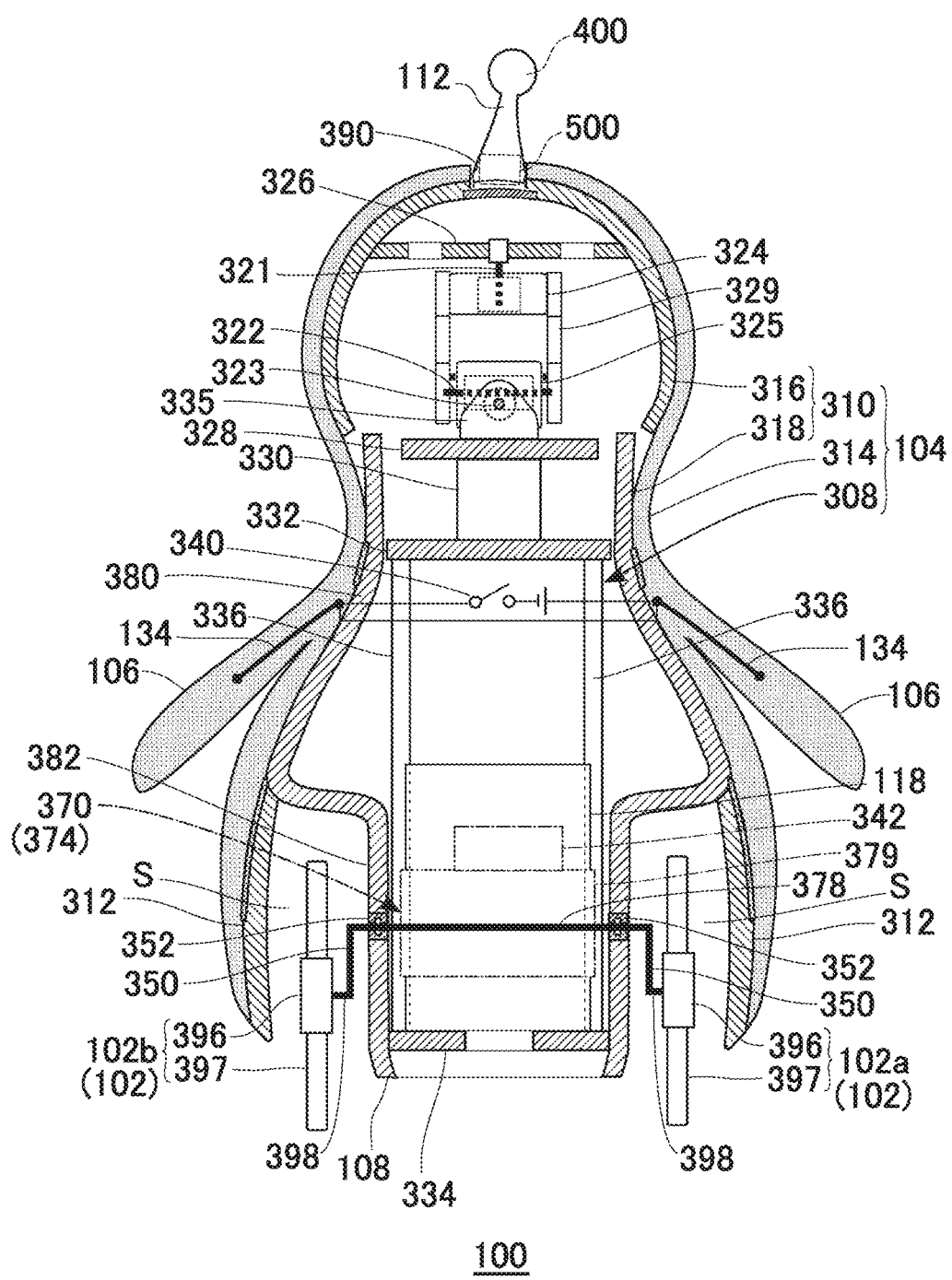
FIG. 2 is a sectional view schematically representing a structure of the robot.
Figure 3:
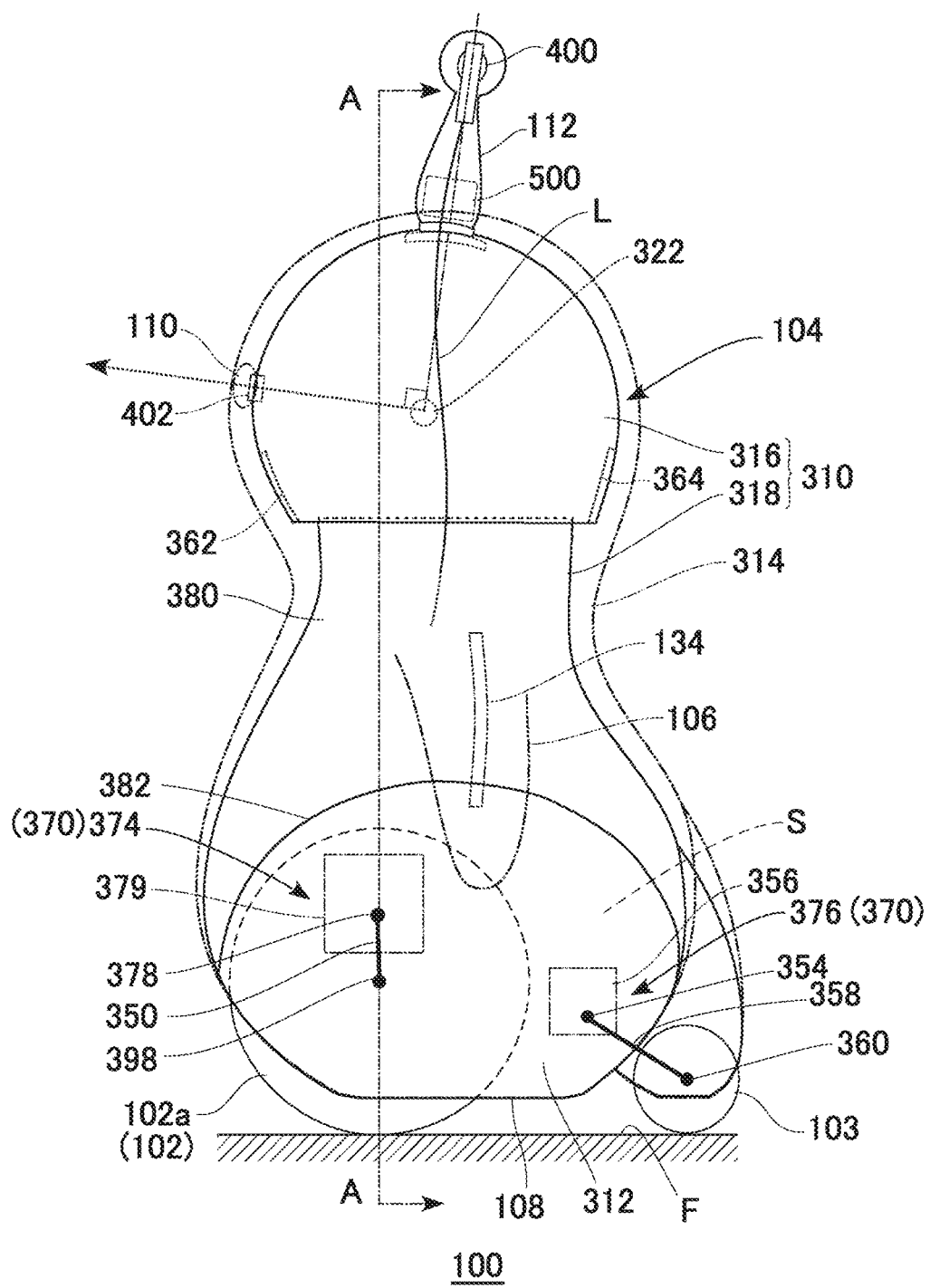
FIG. 3 is a side view representing the structure of the robot centered on a frame.

FIG. 2 is a sectional view schematically representing a structure of the robot 100. FIG. 3 is a side view representing the structure of the robot 100 centered on a frame. FIG. 2 corresponds to a section seen along an A-A arrow of FIG. 3.

As shown in FIG. 2, the body 104 of the robot 100 includes a base frame 308, a main body frame 310, a pair of wheel covers 312, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation can be carried out. A battery 118, a control circuit 342, and various kinds of actuator and the like are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 321, a pitch shaft 322, and a roll shaft 323, and actuators 324 and 325 that drive each shaft so as to rotate, are provided in the head portion frame 316. The actuator 324 includes a servo motor for driving the yaw shaft 321. The actuator 325 includes a multiple of servo motors for driving each of the pitch shaft 322 and the roll shaft 323. The yaw shaft 321 is driven for a head shaking action, the pitch shaft 322 is driven for a nodding action, a looking up action, and a looking down action, and the roll shaft 323 is driven for a head tilting action. A plate 326 supported by the yaw shaft 321 is fixed to an upper portion of the head portion frame 316.

A base plate 328 made of metal is provided so as to support the head portion frame 316 and an internal mechanism thereof from below. The base plate 328 is coupled to the upper plate 332 (the base frame 308) via a joint 330. A support base 335 is provided on the base plate 328, and the actuators 324 and 325 and a crosslink mechanism 329 (a pantagraph mechanism) are supported by the support base 335. The crosslink mechanism 329 couples the actuators 324 and 325 vertically, and can cause an interval between the actuators 324 and 325 to change.

According to this kind of configuration, the actuator 325 and the head portion frame 316 can be caused to rotate (roll) integrally by causing the roll shaft 323 to rotate, whereby an action of tilting the neck can be realized. Also, the crosslink mechanism 329 and the head portion frame 316 can be caused to rotate (pitch) integrally by causing the pitch shaft 322 to rotate, whereby a nodding action and the like can be realized. The plate 326 and the head portion frame 316 can be caused to rotate (yaw) integrally by causing the yaw shaft 321 to rotate, whereby an action of shaking the head can be realized. Furthermore, an action of extending and contracting the neck can be realized by causing the crosslink mechanism 329 to extend and contract.

According to this kind of configuration, the actuator 325 and the head portion frame 316 can be caused to rotate (roll) integrally by causing the roll shaft 323 to rotate, whereby an action of tilting the neck can be realized. Also, the crosslink mechanism 329 and the head portion frame 316 can be caused to rotate (pitch) integrally by causing the pitch shaft 322 to rotate, whereby a nodding action and the like can be realized. The plate 326 and the head portion frame 316 can be caused to rotate (yaw) integrally by causing the yaw shaft 321 to rotate, whereby an action of shaking the head can be realized. Furthermore, an action of extending and contracting the neck can be realized by causing the cross ink mechanism 329 to extend and contract.

The trunk portion frame 318 houses the base frame 303 and a wheel drive mechanism 370. As shown in FIG. 3, the wheel drive mechanism 370 includes a front wheel drive mechanism 374 and a rear wheel drive mechanism 316. An upper half portion 380 of the trunk portion frame 318 is of a smooth curved form so as to provide an outline of the body 104 with roundness. The upper half portion 380 is formed so as to become gradually narrower toward an upper portion corresponding to a neck portion. A lower half portion 382 of the trunk portion frame 318 is of a small width in order to form a housing space S the front wheel 102 between the lower half portion 382 and the wheel cover 312. A boundary of the upper half portion 380 and the lower half portion 382 is of a stepped form.

Left and right side walls configuring the lower half portion 382 are parallel to each other, are penetrated by a pivot shaft 378, to be described hereafter, of the front wheel drive mechanism 374, and support the pivot shaft 378. The lower plate 334 is provided so as to close off a lower end aperture portion of the lower half portion 382. In other words, the base frame 308 is fixed to and supported by a lower end portion of the trunk portion frame 318.

The pair of wheel covers 312 are provided so as to cover the lower half portion 382 of the trunk portion frame 318 from left and right. The wheel cover 312 is formed of resin, and is attached so as to form a smooth outer face (curved face) continuous with the upper half portion 330 of the trunk portion frame 318. An upper end portion of the wheel cover 312 is linked along a lower end portion of the upper half portion 380. Because of this, the housing space S, which is opened downward, is formed between the side wall of the lower half portion 382 and the wheel cover 312.

The outer skin 314 is formed of urethane rubber or sponge, and covers the main body frame 310 and the wheel covers 312 from an outer side. The arms 106 are molded integrally with the outer skin 314. An aperture portion 390 is provided in an upper end portion of the outer skin 314. A lower end portion of the horn 112 is connected to the head portion frame 316 via the aperture portion 390. The horn 112 has a joint mechanism 500 that functions as a joint. When an excessive load is exerted on the horn 112, the load is released by a dislocation action of the joint mechanism 500, whereby damage to the horn 112 is prevented. Also, (a power line 130 and a signal line 132) connected to the control circuit 342 penetrate the joint mechanism 500, and are connected to the omnidirectional camera 400. Details of the joint mechanism 500 will be described hereafter.

The front wheel drive mechanism 374 includes a rotary drive mechanism for causing the front wheel 102 to rotate and a housing operation mechanism for causing the front wheel 102 to enter and withdraw from the housing space S. That is, the front wheel drive mechanism 374 includes the pivot shaft 378 and an actuator 379. The front wheel 102 has a direct drive motor (hereafter written as a "DD motor") 396 in a central portion thereof. The DD motor 396 has an outer rotor structure, a stator is fixed to an axle 398, and a rotor is fixed coaxially to a rim 397 of the front wheel 102. The axle 393 is integrated with the pivot shaft 318 via an arm 350. A bearing 352 through which the pivot shaft 378 penetrates and which supports the pivot shaft 378 so as to be able to pivot is embedded in a lower portion side wall of the trunk portion frame 318. A sealing structure (bearing seal) for hermetically sealing the trunk portion frame 318 inside and outside is provided in the bearing 352. The front wheel 102 can be driven to reciprocate between the housing space S and an exterior by a drive of the actuator 379.

The rear wheel drive mechanism 376 includes a pivot shaft 354 and an actuator 356. Two arms 358 extend from the pivot shaft 354, and an axle 360 is provided integrally with leading ends of the arms 358. The rear wheel 103 is supported so as to be able to rotate by the axle 360. A bearing omitted from the drawings, through which the pivot shaft 354 penetrates and which supports the pivot shaft 354 so as to be able to pivot, is embedded in the lower portion side wall of the trunk portion frame 318. A shaft sealing structure is also provided in the bearing. The rear wheel 103 can be driven to reciprocate between the housing space S and the exterior by a drive of the actuator 356.

When housing the wheels, the actuators 379 and 356 are driven in one direction. At this time, the arm 350 pivots centered on the pivot shaft 378, and the front wheel 102 rises from the floor surface F. Also, the arm 358 pivots centered on the pivot shaft 354, and the rear wheel 103 rises from the floor surface F. Because of this, the body 104 descends, and the seating face 108 is grounded at the floor surface F. Because of this, a state in which the robot 100 is sitting is realized. By the actuators 379 and 356 being driven in the opposite direction, each wheel is caused to advance out of the housing space S, whereby the robot 100 can be caused to stand.

A drive mechanism for driving the arm 106 includes a wire 134 embedded in the outer skin 314, and a drive circuit 340 (energizing circuit) of the wire 134. The wire 134 is formed of a shape memory alloy line in this embodiment, contracts and hardens when heated, and relaxes and lengthens when allowed to cool. Leads drawn out from both ends of the wire 134 are connected to the drive circuit 340. When a switch of the drive circuit 340 is activated, the wire 134 (shape memory alloy line) is energized.

The wire 134 is molded or woven in so as to extend from the outer skin 314 to the arm 106. Leads are drawn from both ends of the wire 134 into the trunk portion frame 318. One wire 134 may be provided in each of a left and right of the outer skin 314, or a multiple of the wire 134 may be provided in parallel in each of the left and right of the outer skin 314. The arm 106 can be raised by energizing the wire 134, and the arm 106 can be lowered by interrupting the energization.

An angle of a line of sight (refer to dotted arrows) of the robot 100 can be adjusted by controlling an angle of rotation of the pitch shaft 322. In the embodiment, for the sake of convenience, a direction of an imaginary straight line passing through the pitch shaft 322 and the eye 110 is taken to be a direction of the line of sight. An optical axis of the high resolution camera 402 coincides with the line of sight. Also, in order to facilitate a computing process which is described below, a straight line joining the omnidirectional camera 400 and pitch shaft 322 and the line of sight are set so as to form a right angle.

Slits 362 and 364 through which the upper end portion of the trunk portion frame 318 can be inserted are provided at the front and back of the head portion frame 316. Because of this, a range of movement (range of rotation) of the head portion frame 316, which is centered on the pitch shaft 322, can be increased. In the embodiment, the range of movement is taken to be 90 degrees, which is 45 degrees each up and down from a state wherein the line of sight is horizontal. That is, a limit value of an angle at which the line of sight of the robot 100 is oriented upward (an angle of looking up) is taken to be 45 degrees, and a limit value of an angle at which the line of sight is oriented downward (an angle of looking down) is also taken to be 45 degrees.

Figure 4:
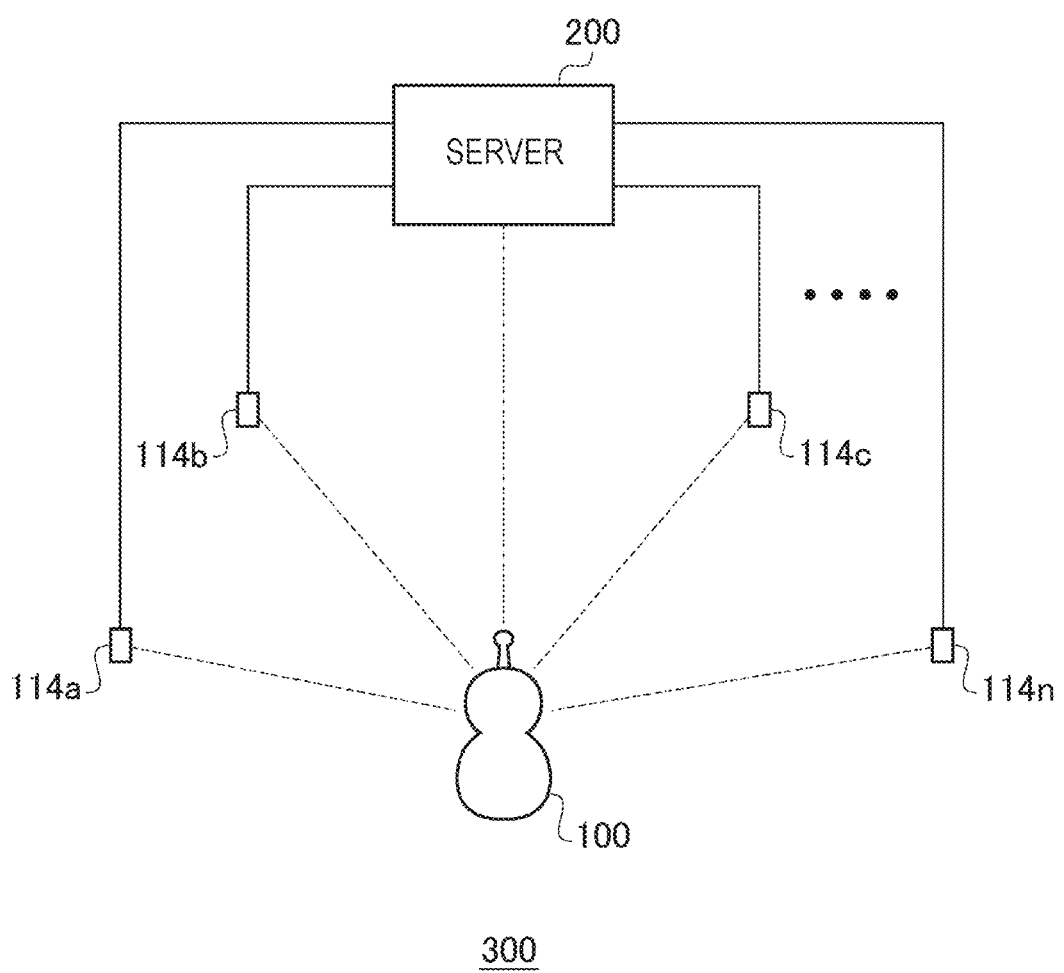
FIG. 4 is a configuration diagram of a robot system.

FIG. 4 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114. The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100. Of course, a method whereby the robot 100 regularly transmits its own positional coordinates to the server 200 may also be adopted.

Figure 5:
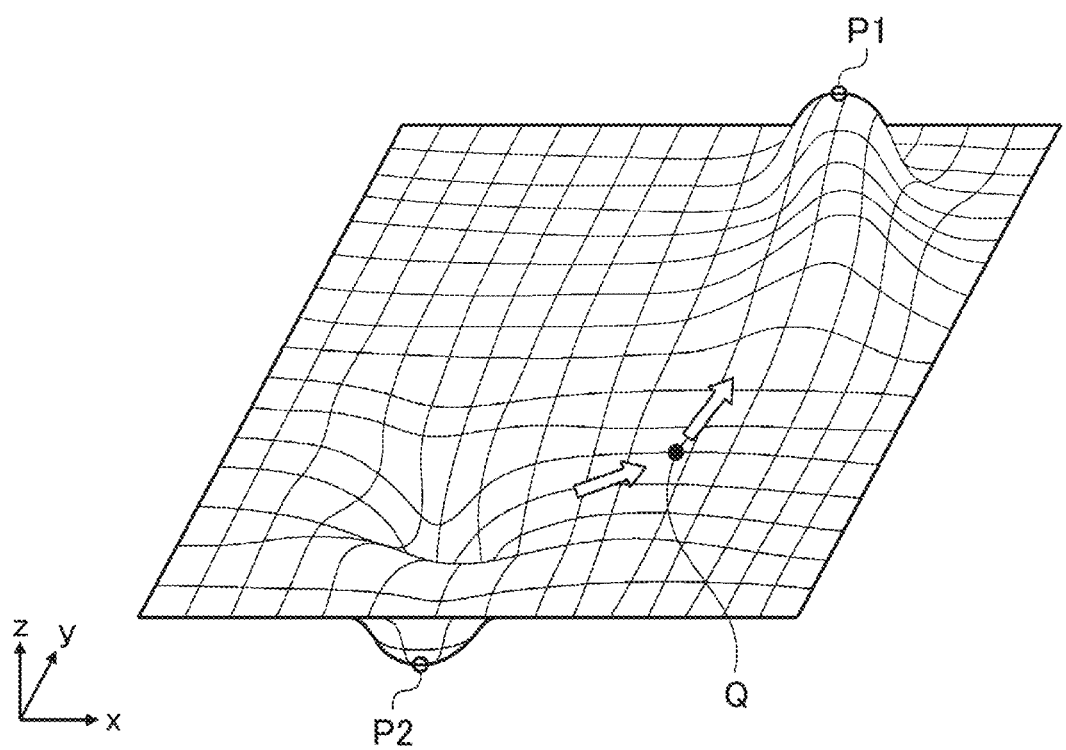
FIG. 5 is a schematic view of an emotion map.

FIG. 5 is a schematic view of an emotion map 116.

The emotion map 116 is a data table stored in the server 200. The robot 100 selects an action in accordance with the emotion map 116. The emotion map 116 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past. A definition of what kind of place the robot 100 favors is arbitrary, but it is generally desirable that a place favored by small children, or by small animals such as dogs or cats, as set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like. A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies position coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the wheel 102, thereby identifying the current position, or may identify the current position based on an image obtained from the camera When the emotion map 116 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek ease of mind, and a desire to seek physical ease such as quietude low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter may be reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 6:
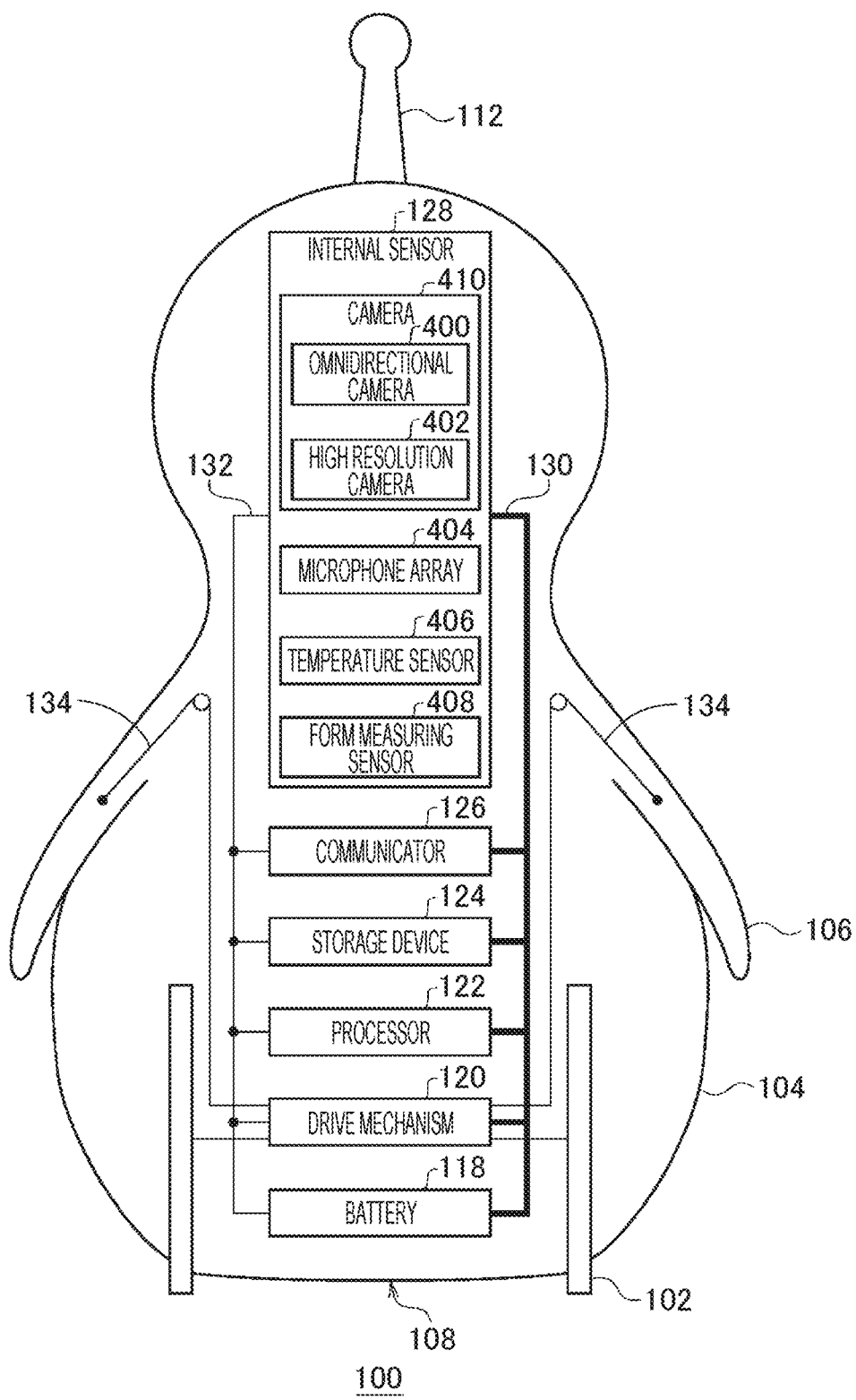
FIG. 6 is a hardware configuration diagram of the robot.

FIG. 6 is a hardware configuration diagram of the robot 100.

The robot 100 includes an internal sensor 128, communicator 126, a storage device 124, a processor 122, a drive mechanism 120, and the battery 118. The drive mechanism 120 includes the wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion battery, and is a power source of the robot 100.

The internal sensor 128 is a collection of various kinds of sensor incorporated in the robot 100. Specifically, the internal sensor 128 is, in addition to a camera 410 (the omnidirectional camera 400 and the high resolution camera 402), a microphone array 404, a temperature sensor 406, and a form measuring sensor 408, an infrared sensor, a touch sensor, an acceleration sensor, a smell sensor, and the like. The smell sensor is an already known sensor that applies a principle that electrical resistance changes in accordance with an adsorption of molecules that form a source of a smell.

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing the computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection.

The drive mechanism 120 mainly controls the wheels (the front wheels 102), the head portion (the head portion frame 316), and the trunk portion (the arm 106). The drive mechanism 120 causes a direction of movement and a movement speed of the robot 100 to change by causing the rotational speed and the direction of rotation of each of the two front wheels 102 to change. Also, the drive mechanism 120 can also raise and lower the wheels (the front wheels 102 and the rear wheel 103). When the wheels rise, the wheels are comply stored in the body 104, and the robot 100 comes into contact with a floor surface via the seating face 108, taking on the sitting state.

The arm 106 can be lifted up by the drive mechanism 120 pulling the arm 106 via the wire 134. A gesture like an arm waving can also be performed by the arm 106 being caused to oscillate. A more complex gesture can also be represented by a large number of the wire 134 being utilized.

Figure 7:
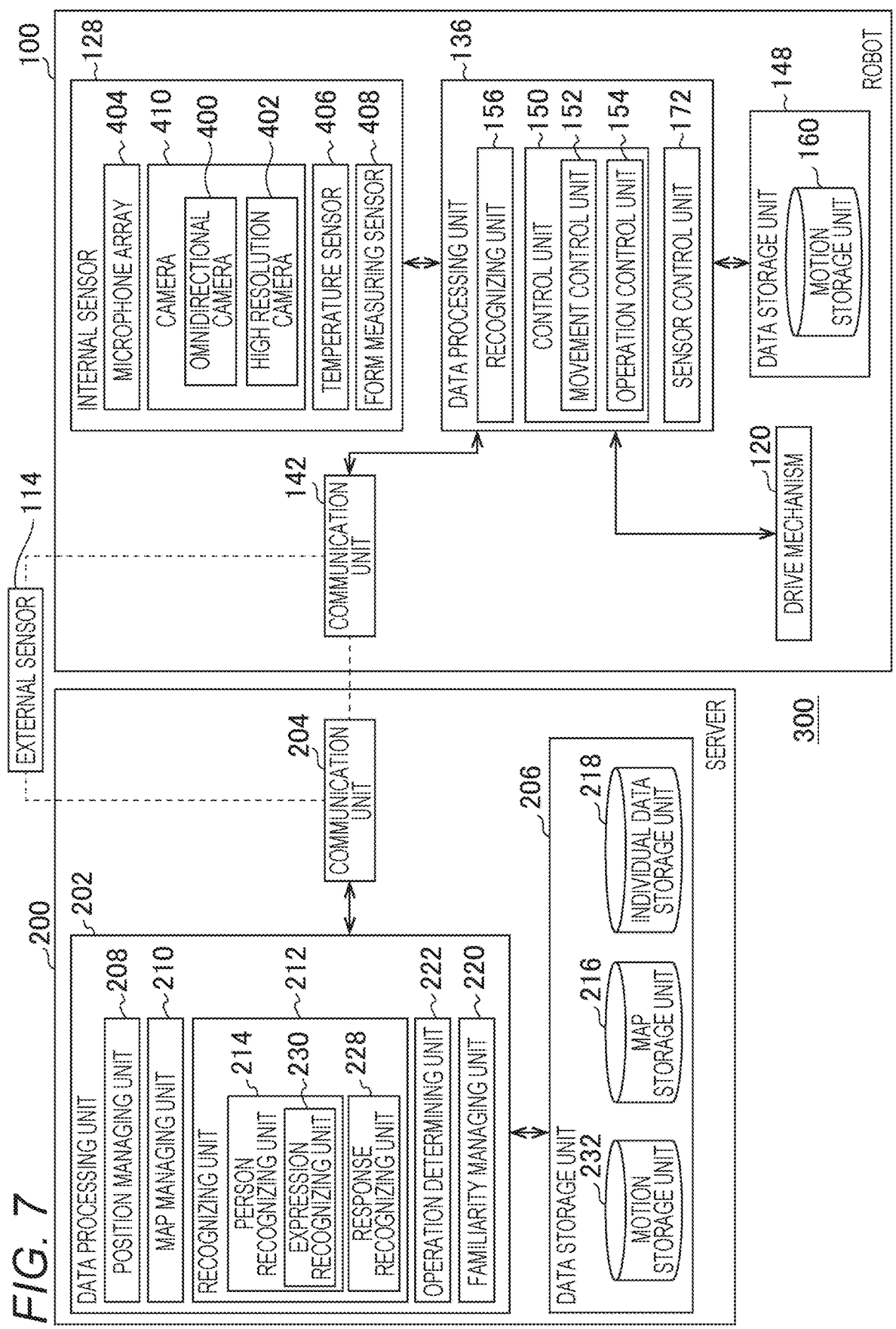
FIG. 7 is a functional block diagram of the robot system.

FIG. 7 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

Server 200

The server 200 includes a communication unit 204, a data process ng unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving a hand, approaching an owner while meandering, and scaring at an owner with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many of the motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being control led together with the passing of time in accordance with the motion file (actuator control information).

A shift time when changing from a preceding unit motion to a subsequent unit motion is called an "interval". It is sufficient that an interval is defined in accordance with time needed for a unit motion change or details of a motion. A length of an interval can be regulated. Hereafter, settings relating to controlling behavior of the robot 100, such as which motion is chosen and when, and regulating output of each actuator when a motion is realized, will collectively be called "behavioral characteristics". Behavioral characteristics of the robot 100 are defined by a motion selection algorithm, a motion selection probability, a motion file, and the like.

The map storage unit 216 stores a multiple of action maps. The individual data storage unit 218 stores information on a use, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad. The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process load is large, but there is an advantage in that even a user who does not have a mobile device can be identified. One of the two methods may be employed alone, or user identification may be carried out using the two methods together in a complementary way. In this embodiment, users are clustered based on physical characteristics and behavioral characteristics, and a user is identified using deep learning (a multilayer neural network).

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met in frequently.

The data processing unit 202 includes a position managing unit 208, a map managing unit 210, a recognizing unit 212, an operation determining unit 222, and a familiarity managing unit 220. The position managing unit 208 identifies the positional coordinates of the robot 100 using the method described using FIG. 4. The position managing unit 208 may also track positional coordinates of a user in real time.

The map managing unit 210 changes the parameter of each coordinate on the multiple of action maps using the method described in connection with FIG. 5. The map managing unit 210 manages a temperature map, which is one kind of action map.

The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1. When the action map A is weighted 5 times with respect to the action map B, the total z value at the coordinate R1 is 4×5−1=19, and the total z value at the coordinate R2 is 3×5+3=18, because of which the robot 100 heads in the direct ion of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user. In addition to a person, the person recognizing unit 214 also, for example, extracts characteristics of a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response. Pleasant and unpleasant actions are distinguished depending on whether a responsive action of a user is pleasing or unpleasant for a living being. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation determining unit 222 determines a motion of the robot 100 in cooperation with a control unit 150 of the robot 100. The operation determining unit 222 complies a movement target point of the robot 100, and a movement route for the movement target point, based on an action map selection by the map managing unit 210. The operation determining unit 222 compiles a multiple of movement routes, and having done so, may select any of the movement routes.

The operation determining unit 222 selects a motion of the robot 100 from a multiple of motions of the motion storage unit 232. A selection probability is correlated to each notion for each situation. For example, a selection method such that a motion A is executed with a 20% probability when a pleasant action is performed by an owner, and a motion B is executed with a 5% probability when a temperature reaches 30 degrees or higher, is defined. A movement target point and a movement route are determined by an action map, and a motion is selected in accordance with various kinds of map, to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, the familiarity managing unit 220 reduces familiarity. Also, familiarity of an owner who has not been visually recognized for a long period gradually decreases.

Robot 100

The robot 100 includes the internal sensor 128, a communication unit 142, a data processing unit 136, a data storage unit 148, and the drive mechanism 120. The internal sensor 128 is a collection of various kinds of sensor. The internal sensor 128 includes the microphone array 404, the camera 410, the temperature sensor 406, and the form measuring sensor 406.

The microphone array 434, being a unit wherein a multiple of microphones are linked together, is a voice sensor that detects sound. It is sufficient that the microphone array 404 is a device that detects sound, and car detect a direction of a source of the sound. The microphone array 404 is incorporated in the head portion frame 316. As distances between a sound source and each microphone do not coincide, variation occurs in sound collection timing. Because of this, a position of the sound source can be identified from a magnitude and a phase of sound at each microphone. The robot 100 can detect a position of a sound source, and in particular a direction of the sound source, using the microphone array 404.

The camera 410 is a device that films the exterior. The camera 410 includes the omnidirectional camera 400 and the high resolution camera 402. The temperature sensor 406 detects a temperature distribution of an external environment, and converts the temperature distribution into an image. The form measuring sensor 408 is an infrared depth sensor that reads a depth, and by extension an uneven form, of a target object by emitting near-infrared rays from a projector, and detecting reflected light of the near-infrared rays using a near-infrared camera.

The communication unit 142 corresponds to the communicator 126 (refer to FIG. 6), and manages a process of communicating with the external sensor 114 and the server 200. The data storage unit 148 stores various kinds of data. The data storage unit 148 corresponds to the storage device 124 (refer to FIG. 6). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded into the motion storage unit 160 from the motion storage unit 232 of the server 200. A motion is identified by motion ID. An operation timing, an operating time, an operating direction, and the like, of the various kinds of actuator (the drive mechanism 120) are defined chronologically in a motion file in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes a recognizing unit 156, the control unit 150, and a sensor control unit 172. The control unit 150 includes a movement control unit 152 and an operation control unit 154. The movement control unit 152 determines a direction of movement of the robot 100 together with the operation determining unit 222 of the server 200. Movement based on an action map may be determined by the server 200, and an immediate movement such as avoiding an obstacle may be determined by the robot 100. The drive mechanism 120 causes the robot 100 to head toward a movement target point by driving the front wheel 102 in accordance with an instruction from the operation control unit 152.

The operation control unit 154 determines a motion of the robot 100 in cooperation with the operation determining unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion may be determined by the robot 100. It is sufficient that a way in which a motion determining process is shared between the server 200 and the robot 100 is designed in accordance with specifications of the robot system 300. The operation control unit 154 instructs the drive mechanism 120 to execute a selected motion. The drive mechanism 120 controls each actuator in accordance with the motion file.

The action control unit 154 can also execute a motion of holding up both arms 106 as a gesture asking for "a hug" when a user with a high degree of familiarity is nearby, and can also perform a motion of no longer wanting to be hugged by causing the left and right front wheels 102 to repeatedly alternate between rotating in reverse and stopping while remaining housed when bored of the "hug". The drive mechanism 120 causes the robot 100 to perform various motions by driving the front wheels 102, the arm 106, and the neck (the head portion frame 316) in accordance with an instruction from the operation control unit 154.

The sensor control unit 172 controls the internal sensor 128. Specifically, the sensor control unit 172 controls a direction of measurement by the high resolution camera 402, the temperature sensor 406, and the form measuring sensor 408. The direction of measurement by the high resolution camera 402, the temperature sensor 406, and the form measuring sensor 408 mounted in the head portion of the robot 100 changes in accordance with the orientation of the head portion frame 316. The sensor control unit 172 controls a direction of filming by the high resolution camera 402 (that is, the sensor control unit 172 controls movement of the head portion in accordance with the direction of filming). The sensor control unit 172 and the camera 410 function as a "filming unit".

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit). The recognizing unit 156 regularly acquires detection information from the camera 410, the temperature sensor 406, and the form measuring sensor 408, and detects a moving object such as a person or a pet. These items of information are transmitted to the server 200, and the person recognizing unit 214 of the server 200 extracts the physical characteristics of the moving object. Also, the recognizing unit 156 also detects a smell of a user and a voice of a user. Smell and sound (voice) are classified into multiple kinds using an already known method.

When a strong force is applied to the robot 100, the recognizing unit 156 recognizes this using the incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, an incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

It is assumed that the robot 100 newly recognizes a moving object (user) in a state in which this kind of cluster analysis using characteristic extraction is completed. At this time, the person recognizing unit 214 of the server 200 extracts characteristics from sensing information of an image or the like obtained from the robot 100, and determines which cluster a moving object near the robot 100 corresponds to using deep learning (a multilayer neural network).

Formation of a cluster by characteristic extraction (cluster analysis) and application to a cluster accompanying characteristic extraction (deep learning) may be executed concurrently. Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

Next, details of the horn 112 and the joint mechanism 500 thereof will be described.

Figure 8:
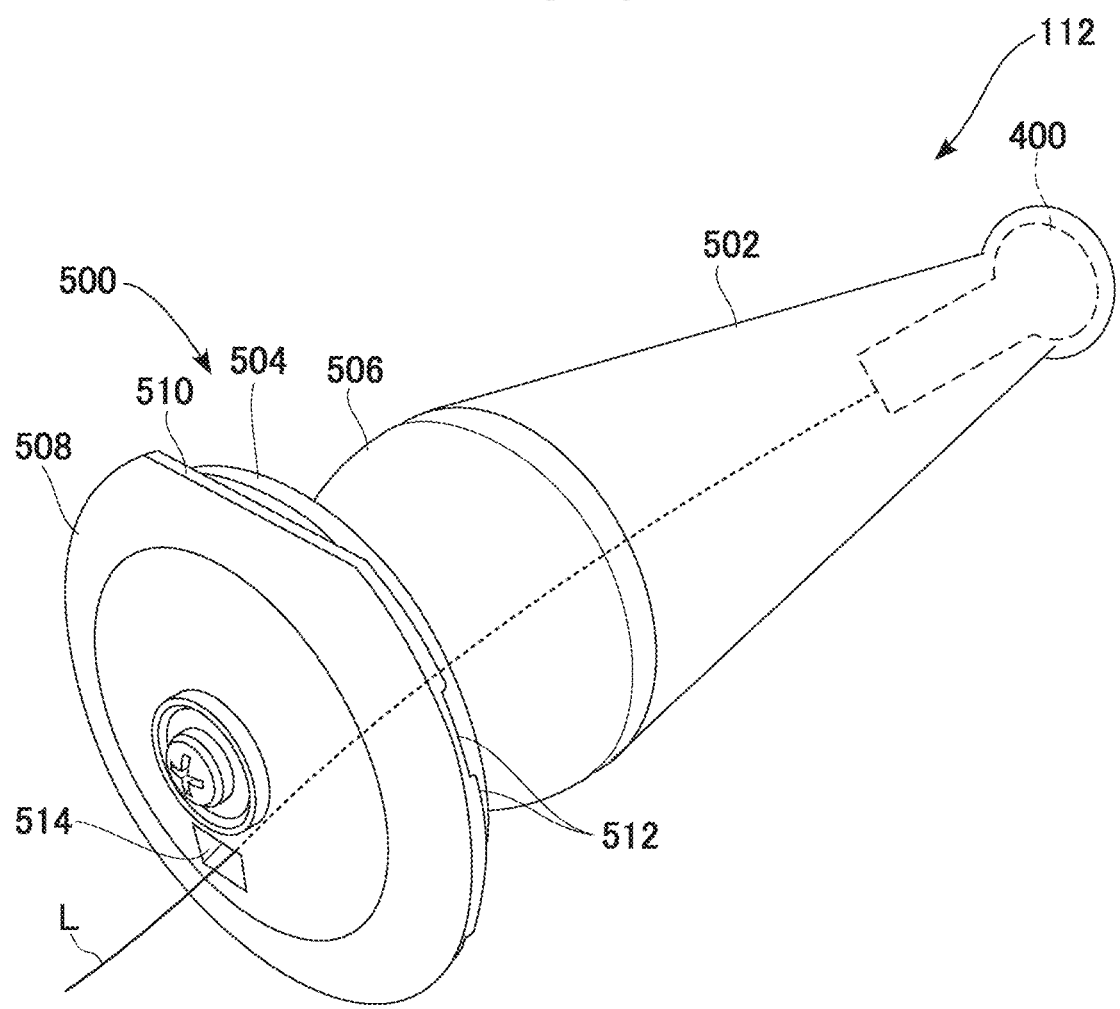
FIG. 8 is a perspective view representing an external appearance of a horn.
Figure 9A:
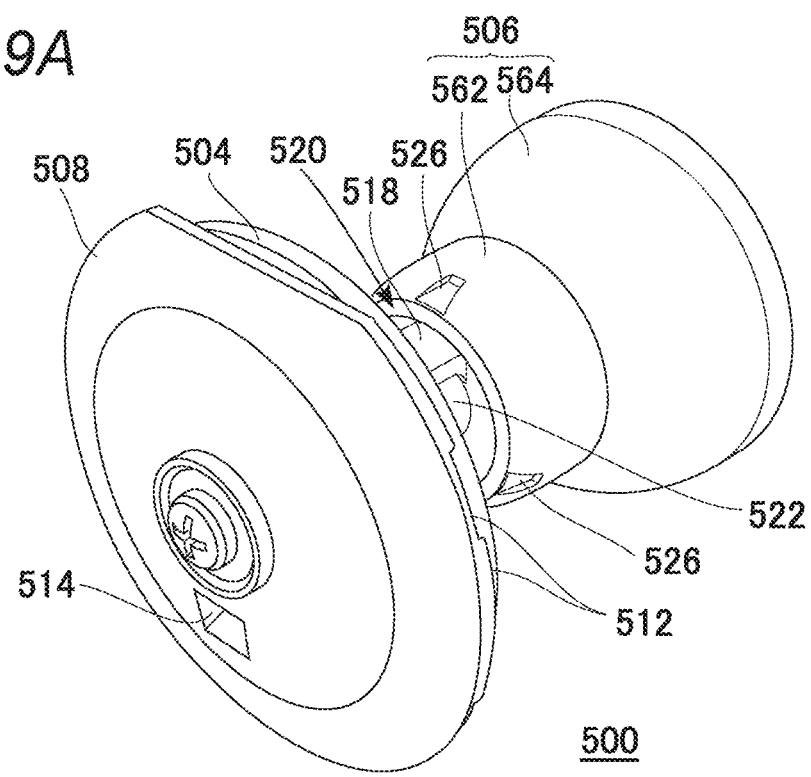
FIG. 9A is a drawing of an uncoupled state of the joint mechanism seen from obliquely in front (from below the horn 112 in FIG. 2)
Figure 9B:
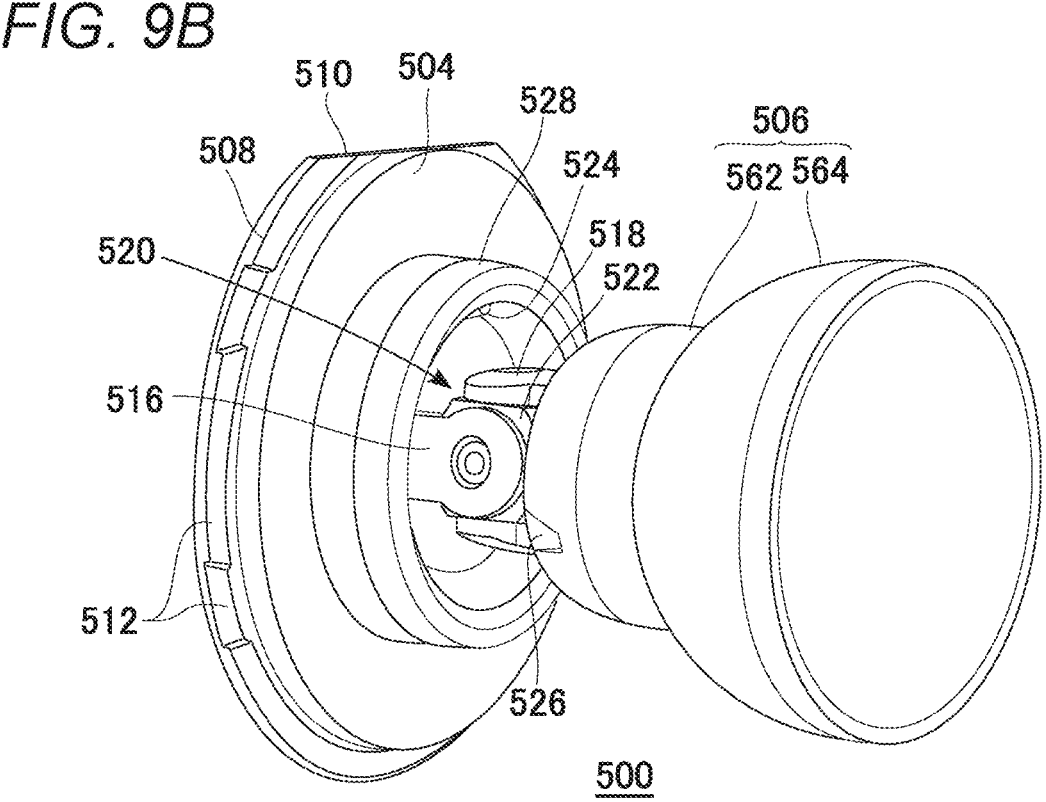
FIG. 9B is a drawing of the joint mechanism in the same state seen from obliquely behind (from above the horn 112 in FIG. 2).

FIG. 8 is a perspective view representing an external appearance of the horn 112. FIGS. 9A and 9B are perspective views representing the joint mechanism 500. FIG. 9A is a drawing of an uncoupled state of the joint mechanism 500 seen from obliquely in front (from below the horn 112 in FIG. 2), and FIG. 9B is a drawing of the joint mechanism 500 in the same state seen from obliquely behind (from above the horn 112 in FIG. 2).

As shown in FIG. 8, the horn 112 is configured by a horn main body 502 being installed in the joint mechanism 500 (a joint structure). The omnidirectional camera 400, acting as a "sensor module", is housed in the horn main body 502. The joint mechanism 500 includes a first member 504 and a second member 506. The first member 504 is installed in the head portion frame 316. The horn main body 502 is installed in the second member 506. In the embodiment, the head portion frame 316 corresponds to a "first region", and the horn main body 502 corresponds to a "second region". Although the first member 504 and the second member 506 are formed of a resin material in the embodiment, the first member 504 and the second member 506 may also be obtained by molding a metal material.

The first member 504 has a flange-form large diameter portion 508, and one portion of a peripheral edge of the large diameter portion 508 is cut away to be flat (a cutaway 510). A circular hole of practically the same shape that engages with the cutaway 510 is provided in a crown portion of the head portion frame 316, so that positioning when carrying out assembly work is easy. Also, an engagement structure 512 having a step in a circumferential direction is formed in a peripheral edge portion of a back face of the large diameter portion 508. An engagement structure corresponding to the engagement structure 512 is formed in the head portion frame 316. The first member 504 can be fixed to the head portion frame 316 by the large diameter portion 508 being applied so that a form, thereof corresponds to the circular hole in the head portion frame 316, and the first member 504 being caused to rotate around an axial line. An insertion hole 514 for inserting wiring L (the power line 130 and the signal line 132) through is formed in the first member 504.

As shown in FIGS. 9A and 9B, the joint mechanism 500 includes a first shaft 516 extending from the first member 504, and a second shaft 518 extending from the second member 506. The first shaft 516 and the second shaft 518 are coupled via a joint 520. The joint 520 is a universal joint, and includes a coupling member 522 to which the first shaft 516 and the second shaft 518 are each connected so as to be capable of pivoting.

The first member 504 supports the first shaft 516 so as to be capable pivoting around the axis of the first shaft 516. The second shaft 518 supports the second member 506 so as to be capable of sliding in an axial direction. By causing the second member 506 to slide forward (in a direction approaching the first member 504) from the state shown in FIGS. 9A and 9B, the first member 504 and the second member 506 can be caused to engage as shown in FIG. 8. A multiple of engagement projections 524 are provided on an inner peripheral face of the first member 504, and a multiple of engagement grooves 526 are provided in an outer peripheral face of a leading end portion of the second member 506. Rotation of the second member 506 with respect to the first member 504 can be locked by each engagement projection 524 being engaged in the corresponding engagement groove 526. Also, an annular elastic member 528 (rubber in the embodiment) is provided on a back face of the first member 504. The elastic member 528 absorbs a force acting between the first member 504 and the second member 506 when the two engage, and when the second member 506 separates from the first member 504, thereby preventing damage to or deformation of the first member 504 and the second member 506. The elastic member 528 also functions as a "coupling mechanism" that receives the second member 506 with an elastic force, and increases a coupling force of the engagement portions of the two members.

Figure 10A:
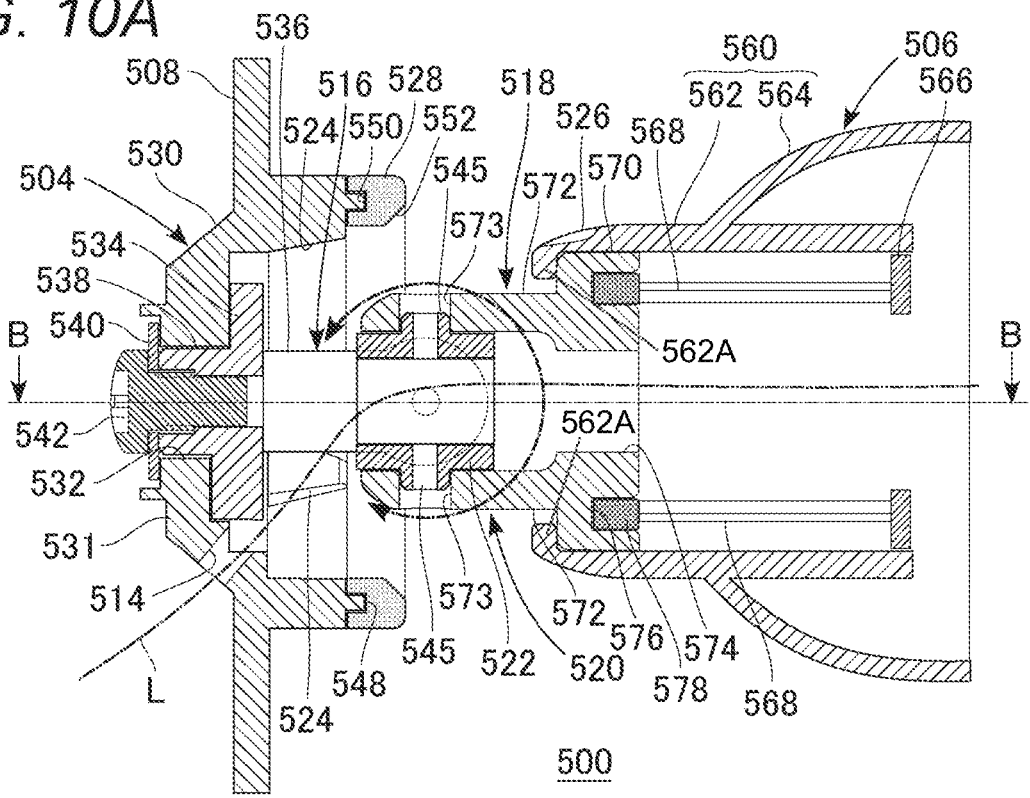
FIG. 10A is vertical cross-sectional view representing an internal structure of the joint mechanism.
Figure 10B:
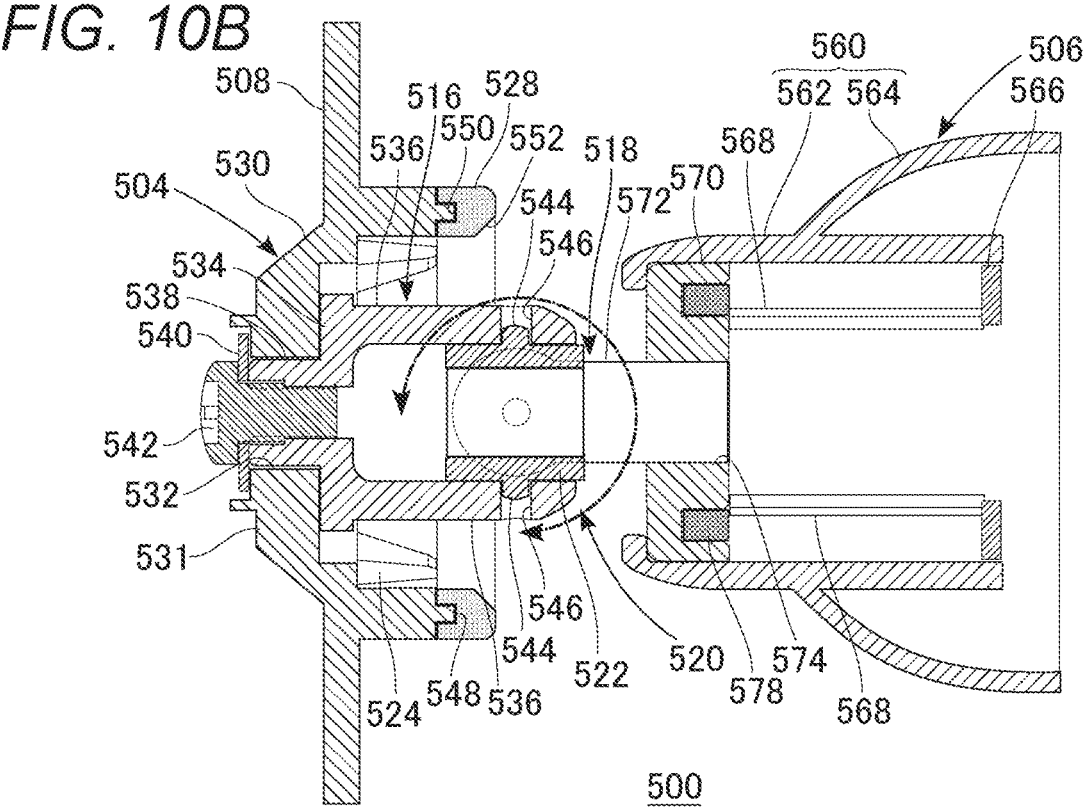
FIG. 10B is a sectional view seen along a B-B arrow of FIG. 10A.
Figure 11A:
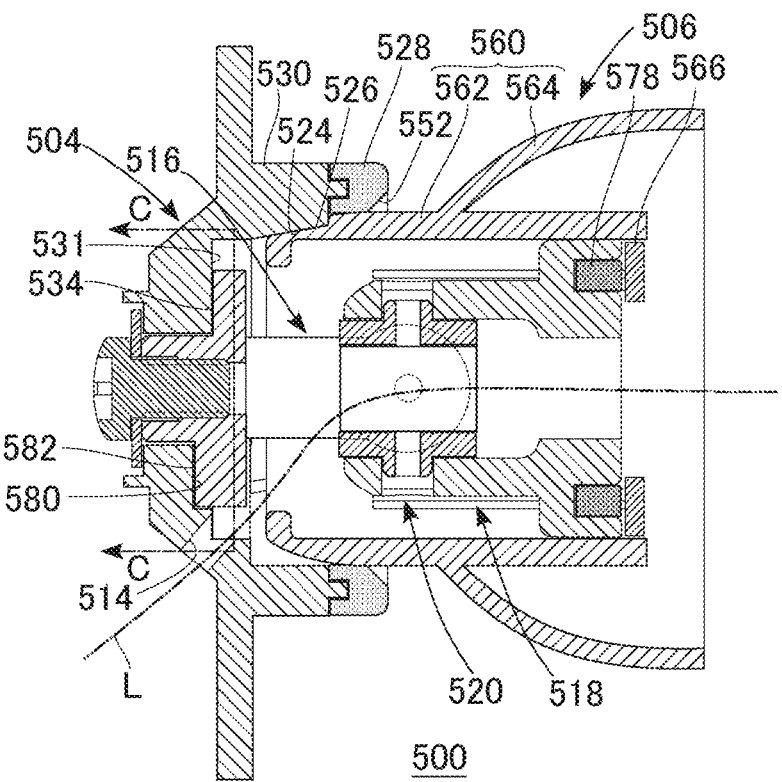
FIG. 11A is a view representing the internal structure of the joint mechanism corresponding to FIG. 10A.
Figure 11B:
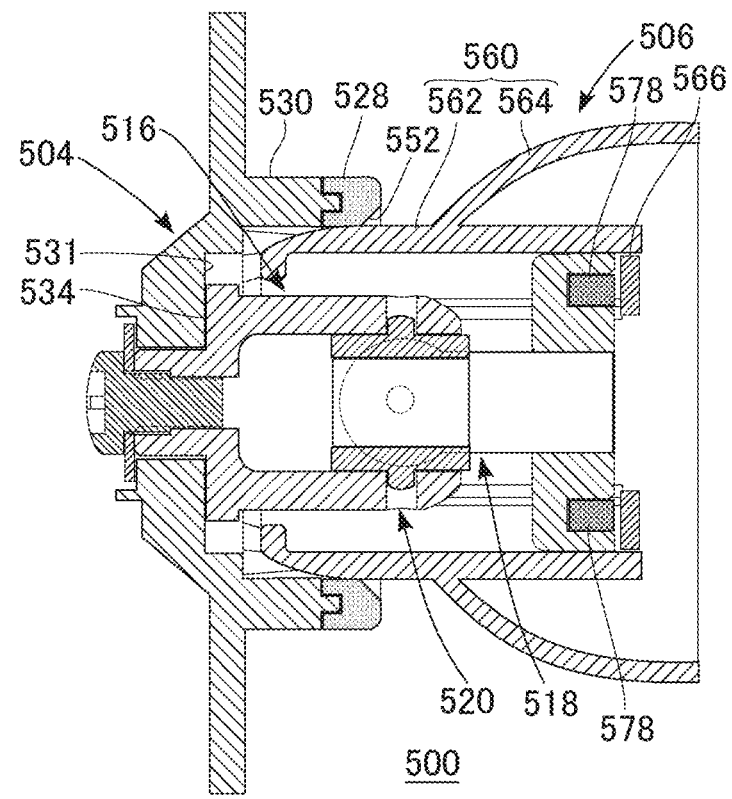
FIG. 11B is a view representing the internal structure of the joint mechanism corresponding to FIG. 10B.

FIGS. 10A and 10B and FIGS. 11A and 11B are sectional views representing an internal structure of the joint mechanism 500. FIGS. 10A and 10B show a non-engaged state of the two members. FIG. 10A is a vertical cross-section, and FIG. 10B is a sectional view seen along a B-B arrow of FIG. 10A. Meanwhile, FIGS. 11A and 11B show an engaged state of the two members. FIG. 11A corresponds to FIG. 10A, and FIG. 11B corresponds to FIG. 10B.

As shown in FIGS. 10A and 10B, the first member 504 has a bottomed, cylindrical main body 530. A flange portion extends outward in a radial direction from a side face of the main body 530, configuring the large diameter portion 508. The first shaft 516 is installed coaxially with the main body 530. An insertion hole 532 through which one end portion of the first shaft 516 is inserted is formed in a center of a bottom portion 531 of the main body 530.

The first shaft 516 has a disk-form base portion 534, a pair of arms 536 that extend in fork form from one side face of the base portion 534, and a circular boss-form shaft portion 538 that extends coaxially from an opposite side face of the base portion 534. The shaft portion 538 is inserted through the insertion hole 532. The pair of arms 536 are disposed symmetrically across an axial line of the base portion 534.

The shaft portion 538 is of a length dimension such that the shaft portion 538 protrudes slightly from the insertion hole 532, and a washer 540 is disposed so as to come into contact with a leading end face of the shaft portion 538. The washer 540 has an outer diameter greater than that of the shaft portion 538, and is fastened to the shaft portion 538 by a screw 542. As shown in the drawings, the bottom portion 531 is sandwiched between the base portion 534 and the washer 540, but an interval between the base portion 534 and the washer 540 is slightly greater than a thickness of the bottom portion 531. According to this kind of configuration, the first shaft 516 is supported with respect to the first member 504 so as to be capable of rotating around the axis of the first shaft 516.

The coupling member 522 is supported so as to be sandwiched between leading ends of the pair of arms 536. The coupling member 522 forms a rectangular cylinder with a square cross-section, a pair of pivots 544 protrude from two side faces forming mutually opposite sides of four side faces of the coupling member 522, and a pair of pivots 545 protrude from the remaining two side faces. The pair of pivots 544 protrude coaxially and with opposite orientations, thereby forming a first rotary shaft. The pair of pivots 545 protrude coaxially and with opposite orientations, thereby forming a second rotary shaft. Axial lines of the rotary shafts are perpendicular to each other. A circular support hole 546 is provided in a leading end portion of each of the pair of arms 536, and the pair of pivots 544 are engaged one in each support hole 546. Because of this, the first shaft 516 and the coupling member 522 can pivot relatively around the axial line of the first rotary shaft.

The multiple of engagement projections 524 are disposed at predetermined intervals on an inner peripheral face of the main body 530. An annular mounting portion 548 is provided projecting at an opened end of the main body 530. An annular recessed groove 550 is formed in a back face of the elastic member 528. The elastic member 528 is mounted on the first shaft 516 by the recessed groove 550 being fitted on the mounting portion 548. Also, an opened end of the elastic member 526 is formed to be tapered (a tapered portion 552), whereby receiving the second member 506 is easy. The second member 506 is installed so that the leading end portion thereof slides along the elastic member 528, even when the second member 506 is somewhat inclined with respect to the first member 504.

Meanwhile, the second member 506 has a stepped, cylindrical main body 560. The main body 560 has a small diameter portion 562 that engages with or separates from the first member 504, and a large diameter portion 564 to which the horn main body 502 is connected. The second shaft 518 is installed coaxially with respect to the main body 560. A leading end portion also called a stopper 562A of the small diameter portion 562 is of an R form, and the multiple of engagement grooves 526 are provided at predetermined intervals in a peripheral face of the small diameter portion 562. An outer peripheral face of the R-form small diameter portion 562 functions as an "engagement face" that engages with the first member 504. An annular magnetic member 566 is fixed to a back end portion of the small diameter portion 562. Also, a multiple of guide portions 568 are provided projecting on an inner peripheral face of the small diameter portion 562, extending in an axial direction.

The second shaft 518 has a cylindrical base portion 570, and a pair of arms 572 that extend in fork form from one side face of the base portion 570. The pair of arms 572 are disposed symmetrically across an axial line of the base portion 570. An insertion hole 574 for inserting the wiring L through is formed in a center of the base portion 570. The insertion hole 514, an internal passage of the coupling member 522, the insertion hole 574, and a passage connecting these, function as a "through path" that penetrates the first shaft 516 and the second shaft 518. A multiple of guide grooves (recessed grooves) that engage one each with the multiple of guide portions 568 are provided in an outer peripheral face of the base portion 570, extending in an axial line direction. Rotation of the second member 506 with respect to the second shaft 518 is prevented by engagement of the guide grooves. Rotation of the second member 506 around the axial line is ensured by rotation of the first shaft 516.

A circular support hole 573 is provided in a leading end portion of each of the pair of arms 572. The support holes 573 engage one each with the pair of pivots 545. Because of this, the second shaft 518 and the coupling member 522 can pivot relatively around the axial line of the second rotary shaft. According to this kind of configuration, the first shaft 516 and the second shaft 518 can pivot around each other via the coupling member 522 (a dashed-dotted line arrow in the drawings).

An outer diameter of the base portion 570 is practically equal to an inner diameter of the small diameter portion 562, and the second member 506 is supported by the second shaft 518 so as to be capable of sliding in an axial line direction. An annular engagement groove 576 is provided in a back face of the base portion 570, and an annular magnet 578 (a permanent magnet in the embodiment) is fitted. The magnet 578 opposes the magnetic member 566 in the axial line direction.

When the second member 506 is caused to slide along the second shaft 518 from the state shown in the drawings, the second member 506 comes into proximity with the first member 504, and comes into contact with the elastic member 528. When the second member 506 is further pressed down against the elastic force of the elastic member 528, the small diameter portion 562 is inserted into the main body 530 of the first member 504, as shown in FIGS. 11A and 11B. The insertion is expedited by the tapered portion 552 of the elastic member 528 and the R form of the small diameter portion 562. At this time, rotation of the second member 506 can be locked by the engagement groove 526 being caused to engage with the engagement projection 524. In this way, the first member 504 can be stably fixed to the second member 506 in a correct position.

Also, a magnetic force is generated between the magnet 578 and the magnetic member 566 at this time, because of which the second member 506 is suctioned (biased) in the axial line direction, and fixed closely to the second shaft 518. That is, fixing in the axial line direction of the second member 506 to the first member 504 is also stable. In other words, unless an external force exceeding the magnetic force is acting in a state in which the second member 506 is engaged with the first member 504, the second member 506 does not separate from the first member 504. That is, the horn 112 does not separate from the head portion frame 316. Resistance of the horn 112 to an external force can be regulated by a setting of the magnetic force of the magnet 578. The magnet 578 and the magnetic member 566 function as a "coupling mechanism" that causes a coupling force of the first member 504 and the second member 506 to be utilized to the full, and also function as a "biasing mechanism" that increases a biasing force of the two members in a direction of coupling.

In the embodiment, strength of main components (the first member 504, the second member 506, the first shaft 516, the second shaft 518, the coupling member 522, and the like) other than the coupling mechanism (biasing mechanism) in the horn 112 is greater than the coupling force of the magnet 578 and the magnetic member 566. Because of this, the horn 112 is prevented from being destroyed without a dislocating action of the joint mechanism 500 occurring. Also, by the weight of the robot 100 (a load in a direction of gravitational force) being greater than the heretofore described coupling force, the horn 112 separates when pulled (comes out owing to a dislocating action). Furthermore, by the weight of the horn 112 (a load in a direction of gravitational force) being less than the heretofore described coupling force, the horn 112 can be held (the engaged state of the first member 504 and the second member 506 can be held) by the coupling force when the robot 100 is operating normally.

Meanwhile, even when the engagement between the first member 504 and the second member 506 is broken due to an external force exceeding the coupling force of the magnet 578 and the magnetic member 566 acting on the horn 112, the first shaft 516 and the second shaft 518 are coupled, because of which the connection between the second member 506 and the first member 504 is not broken. That is, even when the horn 112 separates from the head portion frame 316 due to an aspect such as dislocation, the horn 112 does not fall off. The first shaft 516, the second shaft 518, and the coupling member 522 function as a "connecting member" that connects the first member 504 and the second member 506 by being interposed between the two. Strength of the connection of the first shaft 516 and the second shaft 518 by the coupling member 522 is of sufficient magnitude that the horn 112 (the second member 506) can be held after the first member 504 and the second member 506 separate.

Figure 12A:
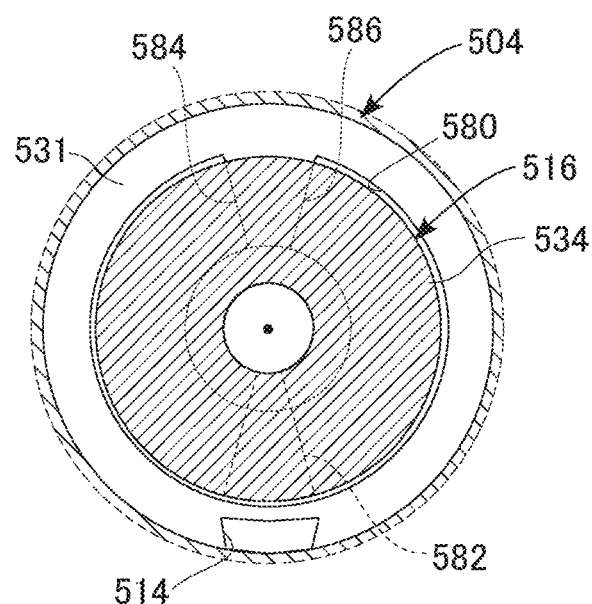
FIG. 12A is a sectional view representing a rotation restricting structure of the second member seen along a C-C arrow of FIG. 11A.
Figure 12B:
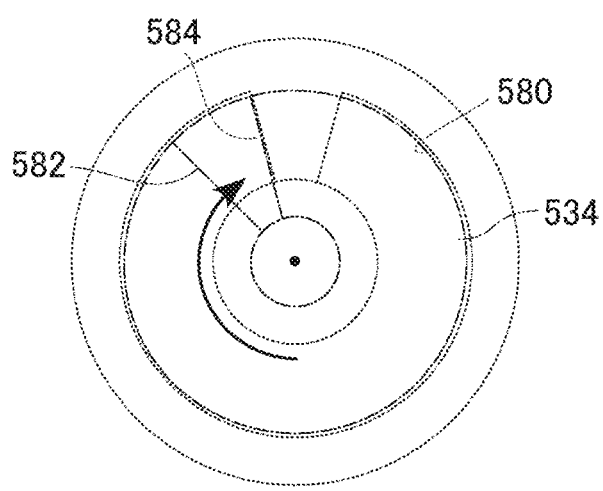
FIGS. 12B and 12C are schematic views indicating a rotation limit when the second member 506 rotates from the state of FIG. 12A.
Figure 12C:
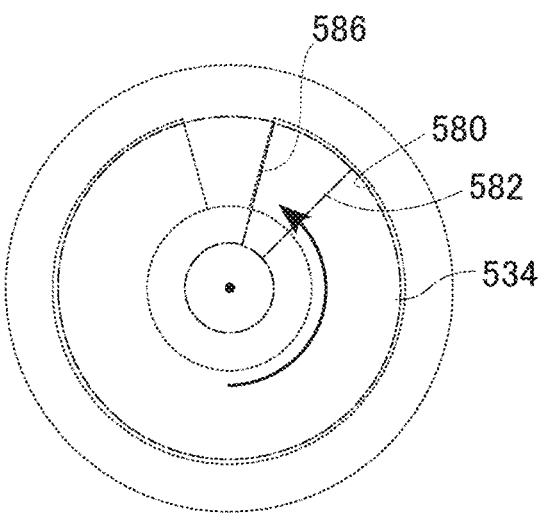

FIGS. 12A, 12B and 12C are illustrations representing a rotation restricting structure of the second member 506. FIG. 12A is a sectional view representing a rotation restricting structure of the second member seen along a C-C arrow of FIG. 11A. FIGS. 12B and 12C are schematic views indicating a rotation limit when the second member 506 rotates from the state of FIG. 12A.

As shown in FIG. 12A, a rotation restricting structure that limits a range of an angle of rotation of the first shaft 516 around the axis of the first shaft 516 is provided between the bottom port on 531 of the first member 504 and the base portion 534 of the first shaft 516. That is, an annular guide groove 580 is formed in the bottom portion 531 in a face opposing the base portion 534. In the embodiment, the range of the guide groove 580 is set to a range of 330 degrees, with the axial line of the base portion 534 as a center, but the angle range can be set as appropriate in a range less than 360 degrees.

Meanwhile, a fan-form locking piece 582 is provided protruding on the base portion 534 on a face opposing the bottom portion 531, and engaged loosely in the guide groove 580. In the embodiment, a width of the locking piece 582 is set in a range of 30 degrees, with the axial line of the base portion 534 as a center, but the angle range can be set as appropriate.

When the first shaft 516 rotates in one direction, the first shaft 516 is locked on a wall 584 positioned at one circumferential end of the guide groove 580, as shown in FIG. 12B. When the first shaft 516 rotates in the other direction, the first shaft 516 is locked on a wall 586 positioned at the other circumferential end of the guide groove 580, as shown in FIG. 12C. Because of this, the angle of rotation of the first shaft 516 is limited to a predetermined angle range of less than 360 degrees (a range of 300 degrees in the embodiment). As already mentioned, rotation of the second member 506 around the axial line is secured by rotation of the first shaft 516, because of which a rotation angle range of the second member 506 is limited in the same way as that of the first shaft 516.

Figure 13A:
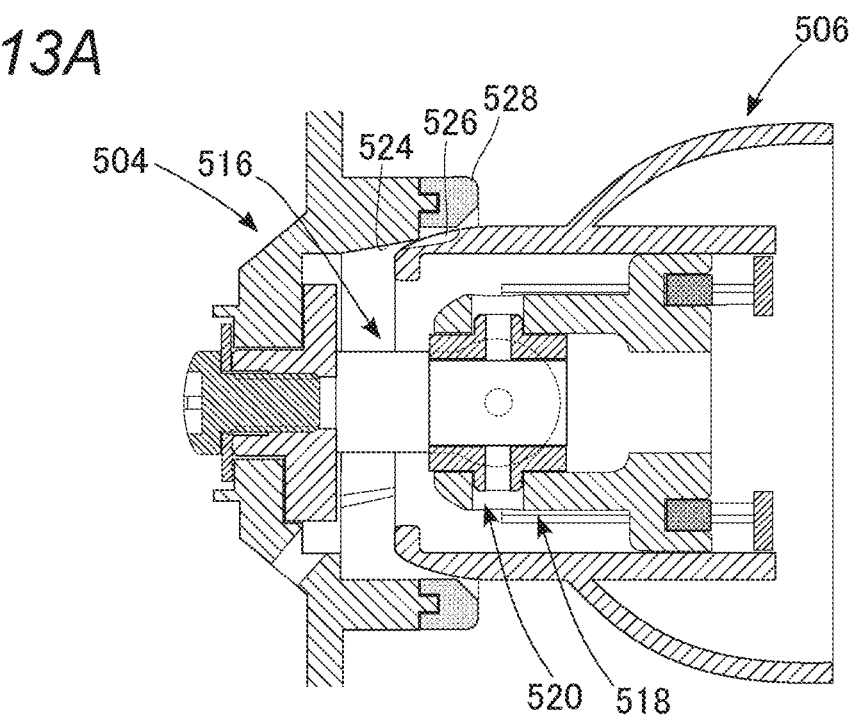
FIGS. 13A and 13B are drawings showing an example of a separating process (engagement breaking) of the second member
Figure 13B:
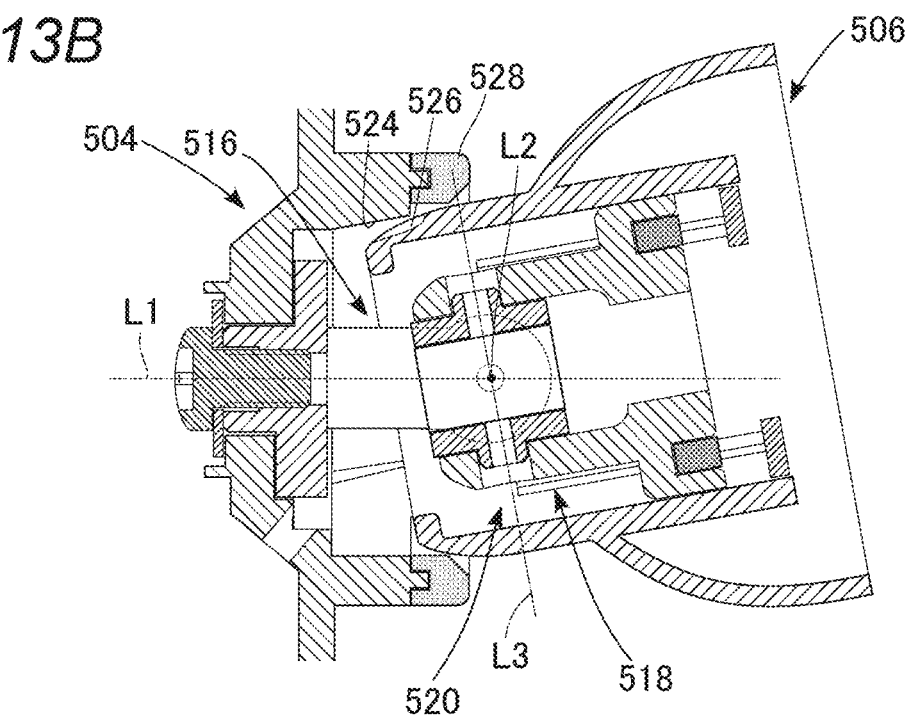

FIGS. 13A and 13B are drawings showing an example of a separating process (engagement breaking) of the second, member 506. FIGS. 13A and 13B show the separating process. In order to cause the second member 506 to separate from the first member 504, it is necessary to at least break the engagement between the engagement projection 524 and the engagement groove 526, as shown in FIG. 13A, in order to do which it is necessary to cause an axial line direction force component to act on the second member 506.

When the second member 506 is displaced by a predetermined amount in a direction away from the first member 504, the engagement between the engagement projection 524 and the engagement groove 526 is broken. By causing a radial direction force component to act on the second member 506 in this state, the second member 506 can be caused to pivot with respect to the first member 504, as shown in FIG. 13B. At this time, the second member 506 can pivot around an axial line L1 of the first shaft 516, around an axial line L2 of the first rotary shaft of the coupling member 522, and around an axial line L3 of the second rotary shaft of the coupling member 522 (that is, around three shafts). Because of this, operating freedom of the horn 112 increases.

Heretofore, a joint structure applied to the robot 100 has been described based on an embodiment. According to the embodiment, the first member 504 provided in the main body of the robot 100 and the second member 506 configuring the horn 112 are configured so as to be capable of engaging and separating (breaking engagement). Even when an unenvisaged external force is exerted on the horn 112 during a behavioral process of the robot 100, an engaged state is broken when relative displacement of the two members exceeds a predetermined amount, and a phenomenon such as dislocation occurs, whereby a load resulting from the external force can be deflected. Because of this, destruction of the horn 112 can be prevented. Also, even when the two members separate, the coupled state of the first shaft 516 and the second shaft 518 is maintained, because of which the horn 112 can be prevented from falling off.

Also, according to the embodiment, a through path penetrating the first shaft 516, the coupling member 522, and the second shaft 518 is formed, and the wiring L is inserted through the through path. As the wiring L is inserted through the joint 520 itself, wiring between members can be carried out at a minimum distance. Even when the joint 520 performs a complex rotating operation, the wiring L does not interfere with the operation. Furthermore, as the rotation angle range of the first shaft 516 is limited to less than 360 degrees, twisting of the wiring L (the power line 130 and the signal line 132) can be prevented or restricted. Because of this, cutting and damaging of the wiring L can be effectively prevented.

Modified Example

Figure 14A:
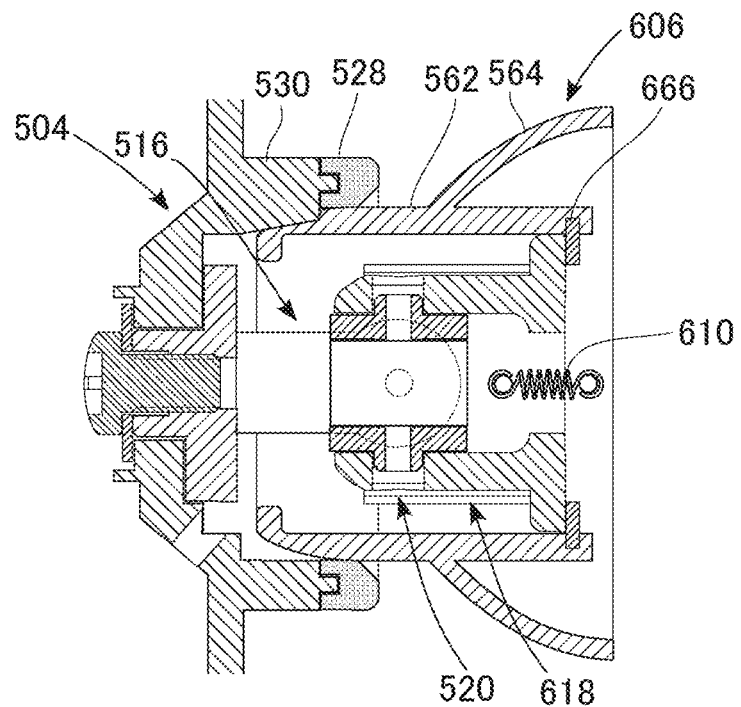
FIG. 14A is a sectional view representing a joint structure according to a first modified example.
Figure 14B:
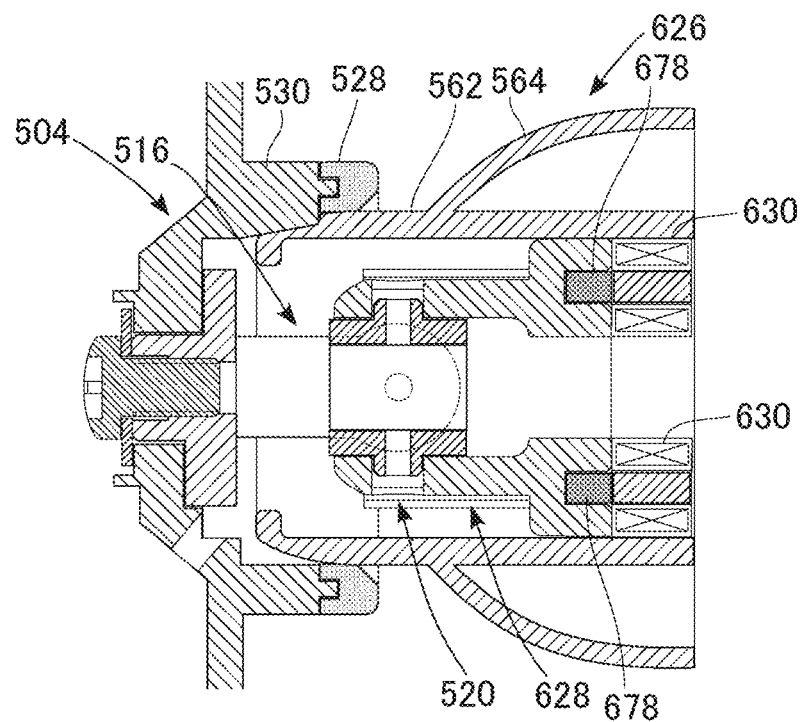
FIG. 14B is a sectional view representing a joint structure according to a second modified example.

FIGS. 14A and 14B are sectional views representing a joint structure according to a modified example. FIG. 14A shows a first modified example, and FIG. 14B shows a second modified example.

In the first modified example, a spring 610 (a tension spring) is provided as a "coupling mechanism" and a "biasing mechanism". One end of the spring 610 is fixed to a second shaft 618, and another end is fixed to the large diameter portion 564 of a second member 606. A retaining ring 666 for preventing the second shaft 618 from falling out is provided in a vicinity of the back end of the small diameter portion 562. According to this kind of configuration, a magnitude (likely or unlikely to cause dislocation) of an external force that should cause a horn to be dislocated can be regulated by selecting a specification (load) of the spring 610.

In the second modified example, an electromagnet 630 is provided as a "coupling mechanism" and a "biasing mechanism". A multiple of the electromagnet 630 are disposed in a vicinity of the back end of the small diameter portion 562 along an inner peripheral face of the small diameter portion 562. A magnetic member 678 is disposed on a second shaft 628 in a face opposing each electromagnet. The control unit 150 controls a supply of power to the electromagnet 630. According to this kind of configuration, an engagement force (coupling force and biasing force) between the first member 504 and a second member 626 can be controlled by regulating a value of current supplied to the electromagnet 630. That is, a magnitude (likely or unlikely to cause dislocation) of an external force that should cause a horn to be dislocated can be regulated in accordance with a situation in which the robot 100 is placed.

Figure 15:
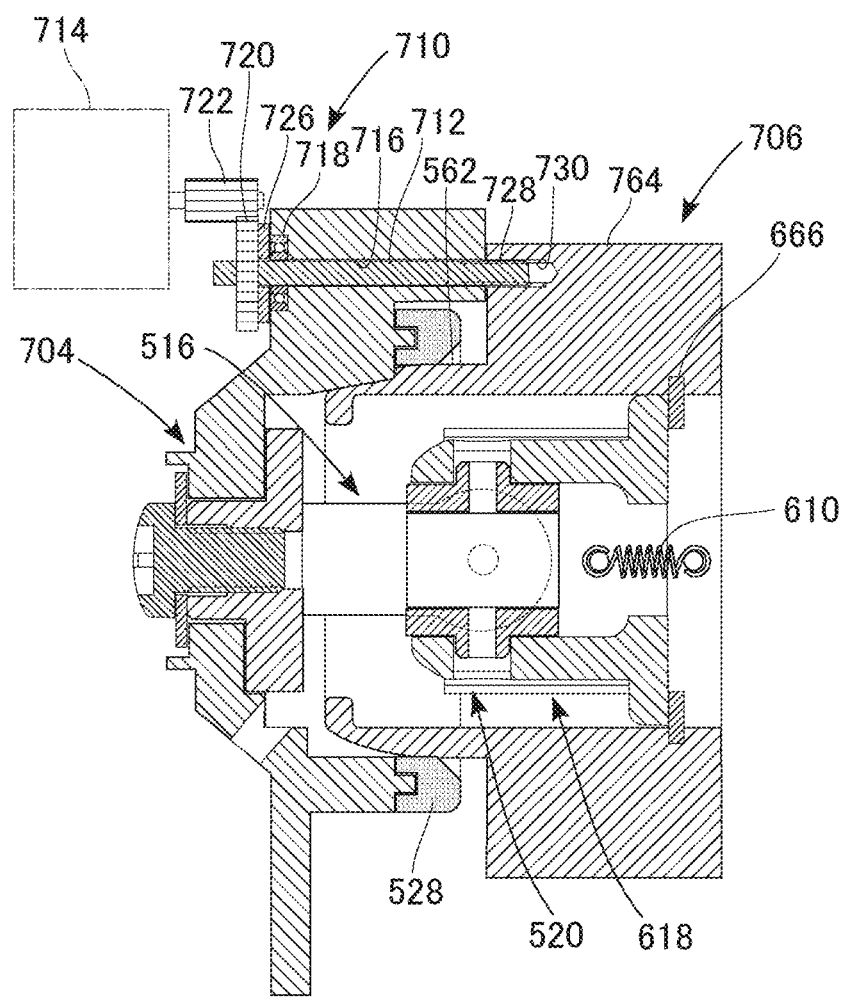
FIG. 15 is a sectional view representing a joint structure according to another modified example.

FIG. 15 is a sectional view representing a joint structure according to another modified example (a third modified example).

In the third modified example, a locking mechanism 710 that can lock an engaged state of a first member 704 and a second member 706 is provided in addition to the configuration of the first modified example. The locking mechanism 710 includes a screw 712 (a bolt) that can fasten the first member 704 and the second member 706, and a motor 714 that drives the screw 712 in a fastening or unfastening direction. The control unit 150 controls the motor 714.

An insertion hole 716 for inserting the screw 712 through is formed penetrating in the first member 704. A bearing 718 is disposed in an opened end portion of the insertion hole 716. A gear 720 is provided coaxially and integrally in a back end portion of the screw 712. The gear 720 engages with an output gear 722 of the motor 714. A washer 726 is interposed between an end face of the first member 704 and the gear 720. Meanwhile, an internally threaded portion 730 is provided in a large diameter portion 764 of the second member 706, and an externally threaded portion 728 of the screw 712 is screwed to the internally threaded portion 730.

By the motor 114 being driven so as to rotate in one direction, the screw 712 can be driven in a fastening direction (to the right in the drawing). By the motor 714 being driven so as to rotate in the other direction, the screw 712 can be driven in an unfastening direction (to the left in the drawing). By driving the screw 712 in the unfastening direction, and causing the externally threaded portion 728 to withdraw from the internally threaded portion 730, the first member 704 and the second member 706 can be caused to separate. According to this kind of configuration, coupling strength of the first member 704 and the second member 706 can be increased by fastening the two. For example, this kind of configuration is effective when a need arises to maintain a coupled state even when a horn breaks.

Figure 16A:
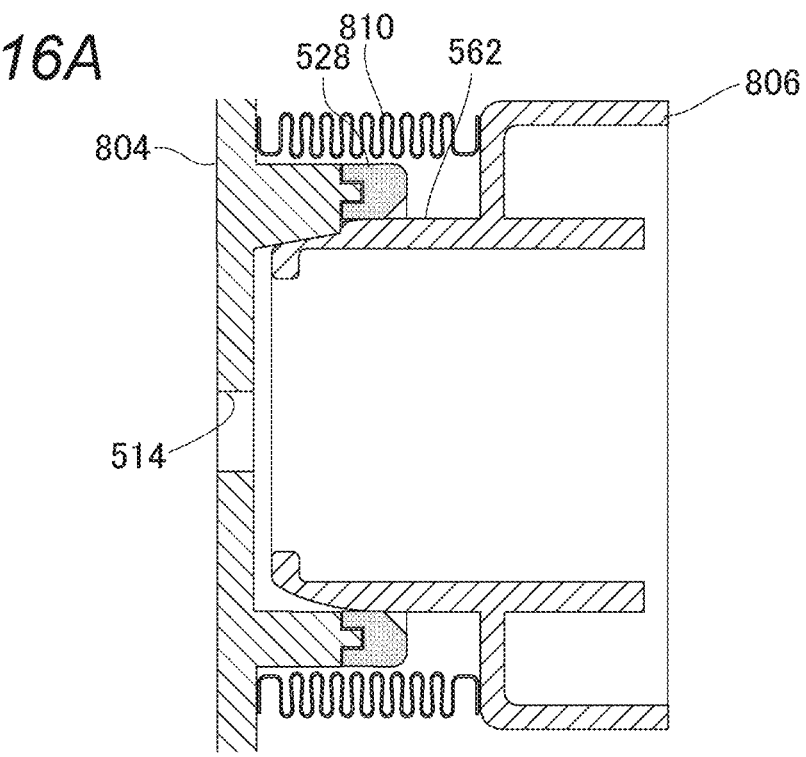
FIGS. 16A and 16B are sectional views representing a joint structure according to another modified example.
Figure 16B:
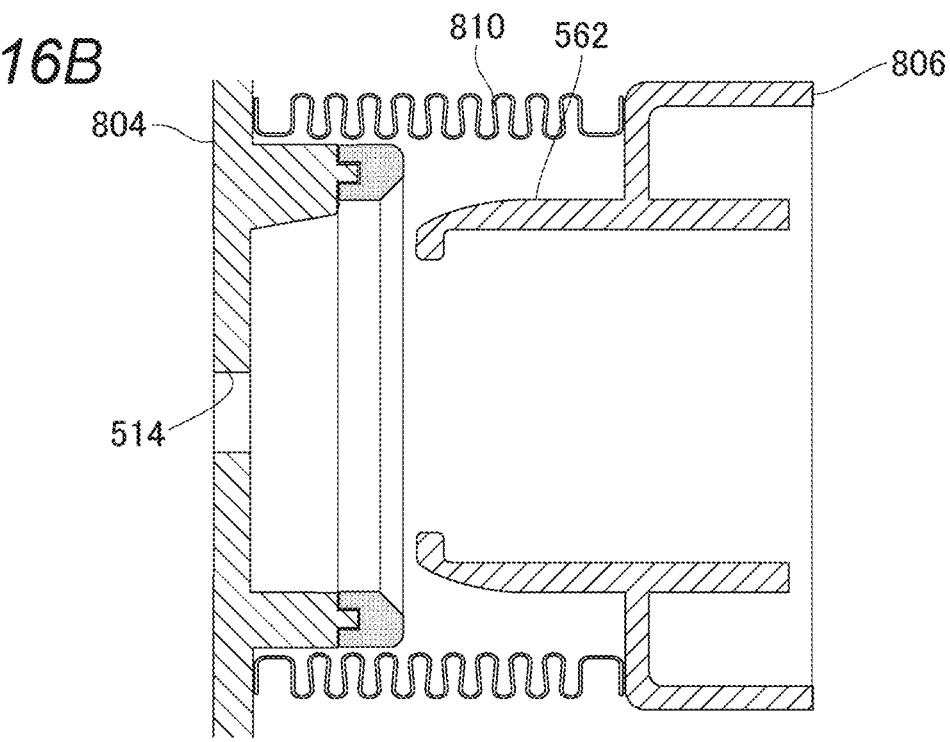

FIGS. 16A and 16B are sectional views representing a joint structure according to another modified example (a fourth modified example). FIG. 16A shows an engaged state of a first member and a second member, and FIG. 16B shows a separated state.

In the fourth modified example, bellows 810 are provided as a "coupling mechanism" and a "biasing mechanism". One end of the bellows 810 is fixed to a first member 804, and another end is fixed to a second member 806. As the bellows 810 have elasticity in an axial line direction, the bellows 810 function as a "biasing mechanism" that biases the first member 804 and the second member 806 in an engaging direction. In this modified example, no first shaft or second shaft is provided The insertion hole 514 for inserting the wiring L through is provided in the first member 804.

By adding an external force in the engaged state shown in FIG. 16A, the second member 806 can be caused to separate in a dislocated aspect, as shown in FIG. 16B. At this time, the bellows 810 function as a "connecting member" that prevents the second member 806 from falling out. According to this kind of configuration, a part quantity of the joint structure can be reduced, whereby a cost reduction can be achieved.

An outer skin of sponge (urethane) or the like may be disposed instead of the bellows 810. Also, the two members may be connected with wire. The wire may be a shape-memory alloy wire. The wire can be caused to tense or relax by energizing or blocking energization of the wire. For example, the wire may be caused to tense when maintaining an engaged of the two members, and caused to relax when allowing separation.

Figure 17:
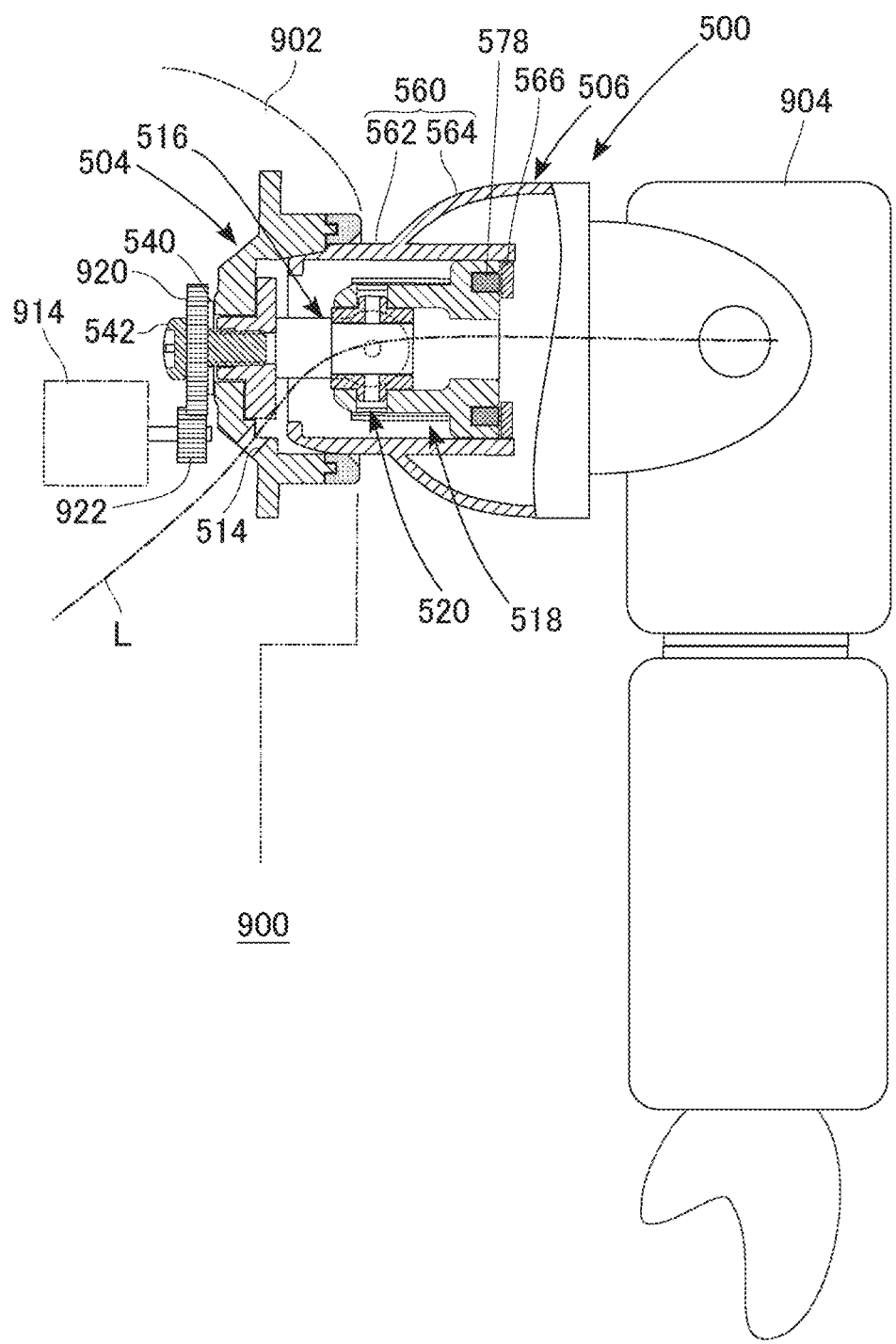
FIG. 17 is a sectional view representing a joint structure according to another modified example.

FIG. 17 is a sectional view representing a joint structure according to another modified example (a fifth modified example).

In the fifth embodiment, the joint mechanism 500 of the heretofore described embodiment is applied to a shoulder joint of a robot 900 (a humanoid robot) A shoulder portion 902 of the robot 900 corresponds to a "first region", and an arm portion 904 corresponds to a "second region". The member 504 configures the shoulder portion 902, and the second member 506 configures the arm portion 904. A description of details of the arm portion 904 will be omitted.

A gear 920 is fixed so as to be sandwiched between the screw 542 and the washer 540. The gear 920 engages with an output gear 922 of a motor 914. The control unit 150 controls the motor 914. The arm portion 904 can be caused to rotate by driving the motor 914. Further, when an external force of a predetermined value or greater is added to the arm portion 904, the second member 506 separates from the first member 504, and the external force can be deflected. In this, way, the joint mechanism 500 of the heretofore described embodiment can also be applied to a shoulder portion joint. Of course, the joint mechanism 500 may be combined with each joint provided in the robot 900. It goes without saying that the joint mechanism 500 can be applied to the shoulder joint of the robot 900 in the same way in the first to fourth modified examples.

The invention not being limited to the heretofore described embodiment and modified example, components can be modified and embodied without departing from the scope of the invention. Various inventions may be formed by appropriately combining a plurality of components disclosed in the heretofore described embodiment and modified example. Also, some components may be omitted from the total of components shown in the heretofore described embodiment and modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

In the heretofore described embodiment, the omnidirectional camera 400 is shown as an example of a "sensor module" provided in the second member, but not being limited to this, various sensors, such as a temperature sensor, can be provided. An "actuator module" such as a motor may be adopted instead of a "sensor module". The wiring L (a power line, a signal line, and the like) is also connected to the actuator module.

Although not mentioned in the heretofore described embodiment, a magnetic sensor (non-contact sensor) formed of a Hall element or the like may be disposed in a vicinity of the magnetic member 566, and attachment or detachment of the magnet 578 and the magnetic member 566 (that is, whether or not the first member 504 and the second member 506 are engaged) detected. A matter that the horn 112 has come out may be determined based on the separation detection, and an alert signal output. The control unit 150 may turn off the power system power supply of the robot 100, or the like, in response to an input of the alert signal. Alternatively, a power supply circuit itself may be interrupted.

Examples wherein the heretofore described joint structure is applied to a horn or a shoulder joint are presented in the heretofore described embodiment and modified examples. In another modified example, the joint structure may be applied to another joint portion, such as an arm or limb joint or a finger joint. For example, when a bipedal walking robot falls over, an unenvisaged force is exerted on an arm, and a joint might break. One foot might slip while a bipedal walking robot is walking, a crotch of the robot might open more than envisaged, and a hip joint might break. In this kind of case, fatal destruction can be prevented provided that there is a dislocation structure owing to the heretofore described kind of joint mechanism. The dislocation structure not needing to be in one place, the dislocation structure may be provided in, for example, each joint (wrist, elbow, and shoulder) of an arm. By the joints being dislocated in order from the wrist when the robot falls over, the robot can be caused to fall over while deflecting a shock.

In the heretofore described embodiment, a universal joint is presented as an example of the joint 520, but a ball joint or other joint may also be employed. When giving consideration to inserting wiring through a pivoting portion of the joint, employing a universal joint is preferable.

An example wherein the second member 506 is introduced into the first member 504 using the elastic member 528, and fixed using the main body 530, is presented in the heretofore described embodiment, as shown in FIGS. 11A and 11B. That is, a base portion of a portion of the first member 504 with which the second member 506 engages is a hard resin material, and a leading end portion is an elastic member. In a modified example, the whole of the portion of the first member 504 with which the second member 506 engages may be an elastic member.

Although not mentioned in the heretofore described embodiment, the magnitude of a load that should cause the second member to separate (be dislocated) can be regulated using a position (pivot fulcrum position) of the coupling member 522 with respect to the second member 506. This is because a rotational moment differs in accordance with a distance between a position in which an external force acts and the fulcrum position. For example, the longer the second shaft 518 is, the greater the rotational moment becomes, because of which separation can be facilitated. When physically regulating a load that should cause separation in this way, the engagement structure formed by the engagement projection 524 and the engagement groove 526 may be omitted. By so doing, the second member 506 can be caused to separate without causing the second member 506 to slide in the axial line direction.

Although not mentioned in the heretofore described embodiment, a first member and a second member may include a locking portion that locks the two members to each other an engaged state. For example, a structure wherein the second member is hooked onto the first member may be adopted. A configuration may be such that a locked state can be broken by an elastic transformation of the locking portion.

In the heretofore described embodiment, a magnet (a coupling mechanism and a biasing mechanism) is disposed between a second shaft and a second member, but the magnet may be disposed between a first member and the second member.

In the fifth modified example, the motor 914 and the first shaft 516 are connected by a gear, but the motor 914 and the first shaft 516 may be connected by a clutch.

A joint structure of the heretofore described embodiment can also be understood in the following way. That is, the joint structure is configured to include a first member, a first shaft supported by the first member, a second shaft coupled via a joint to the first shaft so as to be capable of pivoting, and a second member supported by the second shaft so as to be capable of relative displacement, wherein the second member can be attached to or detached from the first member in accordance with a relative displacement of the second member with respect to the second shaft. A guide portion that guides a sliding of the second member in a longitudinal direction of the second shaft is provided in the joint structure.

A configuration such that the insertion hole 514 is provided in a position separated from the axial line of the first member 504, and the wiring L extending from the second member 506 is inserted through the insertion hole 514, is presented in the heretofore described embodiment, as shown in FIG. 10A. This kind of configuration is such that there is a possibility of the wiring L becoming wound around an outer periphery of the first shaft 516 in accordance with a range of an angle of rotation of the second member 506 with respect to the first member 504. Because of this, it is good when a length of the wiring L is set with leeway, taking the range of the angle of rotation into consideration.

An example wherein the insertion hole 514 is provided in a position separated from the axial line of the first member 504 while the range of the angle of rotation of the first shaft 516 is limited to less than 360 degrees, whereby twisting of the wiring L is restricted and cutting and damage are prevented, is presented in the heretofore described embodiment. In a modified example, an insertion hole may be provided on the axial line of the first member 504 (that is, on the axial line of the first shaft 516). For example, an insertion hole may be provided so that the screw 542 penetrates in the axial line direction, and adopted as one portion of the heretofore described "through path". The "through path" is configured of a path that penetrates the first shaft 516 in the axial line direction thereof, a path that penetrates the second shaft 518 in the axial line direction thereof, and a path that penetrates the coupling member 522 (the connecting member). According to this kind of configuration, the wiring L can be extended along the axial lines of the first shaft 516 and the second shaft 518. As a result of this, the wiring L is less likely to twist, and cutting and breaking of the wiring L can be prevented, even when the second member 506 is caused to rotate around the axial line. There is no longer a need to limit the range of the angle of rotation of the first shaft 516 to less than 360 degrees, and the second member 506 can be allowed to rotate freely around the axial line.

What is claimed is:

1. A joint structure comprising:
    a first member;
    a second member having an engagement face configured to engage with the first member, wherein the second member comprises a stopper configured to restrict displacement in a direction away from the first member to be within a predetermined range;
    a coupler configured to exert a coupling force between the first member and the second member for maintaining an engaged state between the first member and the second member;
    a first shaft supported by the first member;
    a second shaft, wherein the second shaft extends through the second member, the second member is slidable in an axial direction of the second shaft, and the engagement face of the second member is movable in the axial direction relative to the first member as the second member slides in the axial direction; and
    a coupling member configured to couple the first shaft to the second shaft.

2. The joint structure according to claim 1, wherein the coupler comprises a biasing mechanism configured to bias the second member in a direction toward the first member.

3. The joint structure according to claim 1, further comprising an elastic member in at least one of the first member or the second member.

4. The joint structure according to claim 3, wherein
    the elastic member is in the first member, and
    the engagement face comprises a rounded outer peripheral face.

5. The joint structure according to claim 4, wherein
    the elastic member includes a tapered portion in an opened end of the first member, and
    the tapered portion is configured to receive the engagement face.

6. The joint structure according to claim 1, further comprising:
    a through path through the first shaft and the second shaft; and
    a wire through the through path.

7. The joint structure according to claim 1, further comprising a sensor configured to detect a separation between the first member and the second member.

8. The joint structure according to claim 6, further comprising
    a sensor fixed to the second member, wherein the wire is connected to the sensor.

9. The joint structure according to claim 8, wherein the first shaft is rotatable within the first member around an axis of the first shaft.

10. The joint structure according to claim 9, further comprising:
    a rotation regulating structure configured to limit a range of an angle of rotation of the first shaft to a predetermined angle range.

11. A robot comprising:
    a first member;
    a second member having an engagement face configured to engage with the first member, wherein the second member comprises a stopper configured to restrict an amount of displacement of the second member away from the first member;
    a coupler configured to apply a force between the first member and the second member for maintaining an engaged state between the first member and the second member;
    a first shaft supported by the first member;
    a second shaft extending through the second member, wherein the second member is slidable in an axial direction of the second shaft, and the engagement face is movable relative to the first member as the second member slides in the axial direction; and
    a coupling member configured to couple the first shaft to the second shaft, wherein each of the first shaft, the second shaft and the coupling member have an axis in the axial direction during the first member and the second member are in an engaged state.

12. The robot according to claim 11, further comprising:
    a through path through the first shaft and the second shaft;
    a wire through the through path; and
    a sensor fixed to the second member, wherein the wire is connected to the sensor.

13. The robot according to claim 11, wherein the coupler comprises a magnet.

14. The robot according to claim 11, wherein the coupler comprises a spring.

15. The robot according to claim 11, wherein the second member comprises a horn of the robot.

16. The robot according to claim 11, wherein the second member comprises an arm of the robot.

17. The robot according to claim 12, wherein the through path extends through the engagement face.

18. The robot according to claim 12, wherein the wire extends through at least one of the first shaft or the second shaft.

19. The robot according to claim 12, wherein the wire comprises at least one of a signal line or a power line.

20. A robot comprising:
    a first member;
    a second member having an engagement face configured to engage with the first member;
    a coupler configured to apply a force between the first member and the second member for securing the second member to the first member;
    a shaft extending partially through the second member, wherein the shaft is coupled to the first member, the second member is movable along an axial direction of the shaft, and the engagement face is movable in the axial direction relative to the first member as the second member moves in the axial direction; and
    a wire extending through the shaft and the second member into the first member.

* * * * *